(12) United States Patent
Wang et al.

(10) Patent No.: US 12,363,036 B2
(45) Date of Patent: Jul. 15, 2025

(54) METHOD FOR DETERMINING PROCESSING CAPABILITY, NODE, AND SYSTEM

(71) Applicant: Huawei Technologies Co., Ltd., Shenzhen (CN)

(72) Inventors: Yali Wang, Beijing (CN); Jie Dong, Beijing (CN); Tianran Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 307 days.

(21) Appl. No.: 18/072,981

(22) Filed: Dec. 1, 2022

(65) Prior Publication Data

US 2023/0086487 A1    Mar. 23, 2023

Related U.S. Application Data

(63) Continuation of application No. PCT/CN2021/097363, filed on May 31, 2021.

(30) Foreign Application Priority Data

Jun. 2, 2020 (CN) .......................... 202010490005.2
Jun. 12, 2020 (CN) .......................... 202010537791.7

(51) Int. Cl.
*H04L 45/74* (2022.01)
*H04L 45/12* (2022.01)

(52) U.S. Cl.
CPC ............ *H04L 45/74* (2013.01); *H04L 45/127* (2013.01)

(58) Field of Classification Search
None
See application file for complete search history.

(56) References Cited

U.S. PATENT DOCUMENTS

| 2008/0181216 A1 | 7/2008 | Breau et al. |
| 2010/0074256 A1 | 3/2010 | Seok et al. |

(Continued)

FOREIGN PATENT DOCUMENTS

| CN | 1531285 A | 9/2004 |
| CN | 1937543 A | 3/2007 |

(Continued)

OTHER PUBLICATIONS

L. Andersson et al, MPLS Extension Header Architecture, draft-andersson-mpls-eh-architecture-00, MPLS Working Group, Feb. 13, 2019, XP015131081, 13 pages.

(Continued)

*Primary Examiner* — Lonnie V Sweet
(74) *Attorney, Agent, or Firm* — Conley Rose, P.C.

(57) ABSTRACT

A method for determining a processing capability includes: a first node sends a message to a second node. The message includes extension header processing capability information, and the extension header processing capability information is used to indicate a processing capability of the first node for an Internet Protocol (IP) version 6 (IPv6) extension header. After receiving the message, the second node obtains, based on the extension header processing capability information, the processing capability of the first node for the IPv6 extension header to determine whether the first node needs to forward or receive a packet.

20 Claims, 7 Drawing Sheets

(56) References Cited

U.S. PATENT DOCUMENTS

| | | | |
|---|---|---|---|
| 2012/0047573 A1* | 2/2012 | Duncan | H04L 63/1425 726/13 |
| 2014/0119387 A1 | 5/2014 | Jiang et al. | |
| 2015/0188885 A1 | 7/2015 | Jager | |
| 2018/0375684 A1 | 12/2018 | Filsfils et al. | |
| 2019/0068498 A1* | 2/2019 | Perez | H04L 45/741 |
| 2019/0097920 A1* | 3/2019 | Han | H04L 69/325 |
| 2021/0044514 A1 | 2/2021 | Xie et al. | |
| 2021/0083973 A1 | 3/2021 | Peng et al. | |
| 2021/0250281 A1 | 8/2021 | Li et al. | |
| 2021/0266189 A1 | 8/2021 | Xie et al. | |

FOREIGN PATENT DOCUMENTS

| | | |
|---|---|---|
| CN | 105589506 A | 5/2016 |
| CN | 105991437 A | 10/2016 |
| CN | 106411738 A | 2/2017 |
| CN | 106487686 A | 3/2017 |
| CN | 106656781 A | 5/2017 |
| CN | 107786442 A | 3/2018 |
| CN | 107979544 A | 5/2018 |
| CN | 110417657 A | 11/2019 |
| CN | 110557329 A | 12/2019 |
| CN | 110832813 A | 2/2020 |
| CN | 110891022 A | 3/2020 |
| CN | 111107004 A | 5/2020 |
| CN | 111147379 A | 5/2020 |
| CN | 111147383 A | 5/2020 |
| JP | 2011071701 A | 4/2011 |
| WO | 2013056447 A1 | 4/2013 |

OTHER PUBLICATIONS

D. Dhody et al, PCEP extensions for Distribution of Link-State and TE Information, draft-dhodylee-pce-pcep-ls-15, PCE Working Group, Mar. 9, 2020, 77 pages.

Donald Eastlake et al, Transparent Interconnection of Lots of Links (TRILL) Use of IS-IS, draft-eastlake-isis-rfc6326bis-03.txt, Network Working Group, Jan. 5, 2012, XP015080055, 45 pages.

S. Bhandari et al, In-situ OAM IPV6 Options, draft-ietf-ippm-ioam-ipv6-options-01, ippm, Internet-Draft, Mar. 8, 2020, 17 pages.

Z. Li et al, Application-aware IPV6 Networking, draft-li-6man-app-aware-ipv6-network-01, Network Working Group, Apr. 20, 2020, 27 pages.

Request for Comments: 2460, S. Deering et al, Internet Protocol, Version 6 (IPv6) Specification, Network Working Group, Dec. 1998, 39 pages.

Request for Comments: 5305, Tony Li et al, IS-IS Extensions for Traffic Engineering, Oct. 2008, 17 pages.

Request for Comments: 7179, D. Eastlake 3rd et al, Transparent Interconnection of Lots of Links (TRTLL): Header Extension, May 2014, XP015100653, 12 pages.

Request for Comments: 7752, Hannes Gredler et al, North-Bound Distribution of Link-State and Traffic Engineering (TE) Information Using BGP, Mar. 2016, 48 pages.

Request for Comments: 7770, Acee Lindem et al, Extensions to OSPF for Advertising Optional Router Capabilities, Feb. 2016, 15 pages.

Request for Comments: 7981, Les Ginsberg et al, IS-IS Extensions for Advertising Router Information, Oct. 2016, 10 pages.

Request for Comments: 8200, S. Deering et al, Internet Protocol, Version 6 (IPv6) Specification, Jul. 2017, 42 pages.

Request for Comments: 9486, Shwetha Bhandari et al, IPV6 Options for In Situ Operations, Administration, and Maintenance (IOAM), Sep. 2023, 10 pages.

* cited by examiner

METHOD FOR DETERMINING PROCESSING CAPABILITY, NODE, AND SYSTEM

CROSS-REFERENCE TO RELATED APPLICATIONS

This application is a continuation of International Patent Application No. PCT/CN2021/097363 filed on May 31, 2021, which claims priority to Chinese Patent Application No. 202010490005.2 filed on Jun. 2, 2020 and Chinese Patent Application No. 202010537791.7 filed on Jun. 12, 2020. All of the aforementioned applications are hereby incorporated by reference in their entireties.

TECHNICAL FIELD

Embodiments of this application relate to the communications field, and in particular, to a method for determining a processing capability, a node, and a system.

BACKGROUND

Internet Protocol (IP) version 6 (IPv6) is a new version of the IP, which is designed by the Internet Engineering Task Force (IETF) to resolve a problem of IP version 4 (IPv4) address exhaustion. IPv6 can be used to not only resolve a problem about a quantity of network address resources, but also greatly resolve obstacles when a plurality of access devices is connected to the Internet. An overall structure of an IPv6 packet includes three parts: an IPv6 packet header, an extended packet header (or an extension header), and upper-layer protocol data. The extension header may be added when required. The IPv6 protocol implements various optional functions such as routing and fragmentation by using the extension header. With the popularization and application of IPv6, the IPv6 extension header may further carry a service requirement parameter, a flow detection parameter, or the like of an application, to implement functions such as application-aware IPv6 networking (APN6) and in-situ flow information telemetry (iFIT). Parameters, such as bandwidth, delay, packet loss rate, and jitter parameters, related to implementing specific functions may be carried in a hop-by-hop options header (HBH) or a destination options header (DOH), so that a node receiving the extension header can perform corresponding processing based on parameter information in the extension header.

Considering that some nodes in a network may not support processing of an extension header such as the IPv6 HBH or DOH, according to the Internet Engineering Task Force (IETF) standard Request for Comments (RFC) 8200, a node can perform four different types of processing on the HBH or the DOH: discard, ignore, forward, or send to control plane. The node may support one or more of the four types as appropriate, which achieves a more flexible configuration combination of the node on one hand. However, on the other hand, nodes on a flow transmission path may process the HBH or the DOH in inconsistent processing modes, resulting in a problem such as a packet loss or a relatively long delay during flow transmission.

SUMMARY

This application provides a method for determining a processing capability, a node, and a system, so that a node in a network can plan an appropriate path or select a specific node based on a processing capability of another node for an IPv6 extension header, thereby ensuring normal packet forwarding, and improving network running stability and quality of service.

According to a first aspect, this application provides a method for determining a processing capability. The method may be performed by a first node. The first node sends a message to a second node. The message includes first extension header processing capability information, and the first extension header processing capability information is used to indicate a processing capability of the first node for an IPv6 extension header.

According to the method for determining a processing capability that is provided in this application, the first node can notify the processing capability of the first node for the IPv6 extension header to a controller or another forward node in a same control domain, so that the second node serving as a receive node can perform subsequent operations such as path planning and node selection based on the capability of the first node, to ensure normal packet forwarding. The control domain may be, for example, an iFIT detection domain, an Internal Gateway Protocol (IGP) domain, a Border Gateway Protocol (BGP) domain, an autonomous system (AS) domain, or a same management domain across AS domains.

For example, in an iFIT or APN6 scenario, a controller may plan a packet forwarding path based on a processing capability of each node in a network for the IPv6 extension header, and each node on the forwarding path can perform normal processing on the IPv6 extension header. In this way, on one hand, each node does not discard a packet because the node cannot process the IPv6 extension header, thereby improving network running robustness, and on the other hand, each node can obtain, by processing the extension header, parameter information carried in the extension header, to implement a function that needs to be completed in the iFIT or APN6 scenario, thereby improving network quality of service.

With reference to the first aspect, in a possible implementation, the processing capability includes a processing mode, and the processing mode is used to indicate a processing mode of the first node for the IPv6 extension header. The processing mode belongs to an aspect of the processing capability, and is used to indicate the processing mode of the first node for the IPv6 extension header. The processing mode may also be referred to as an action, a behaving manner, an operation manner, or the like.

With reference to the first aspect or any possible implementation of the first aspect, in another possible implementation, the processing mode includes one or more of a current processing mode and a configurable processing mode.

When the processing mode includes the current processing mode, the current processing mode may be used to indicate a processing mode that currently has been configured on the first node for the extension header.

When the processing mode includes the configurable processing mode, the configurable processing mode may be used to indicate one or more processing modes that are allowed to be configured on the first node for the extension header.

When the processing mode includes only the current processing mode, the second node generally cannot change the current processing mode. When the processing mode includes only the configurable processing mode, or includes the configurable processing mode in addition to the current processing mode, the second node may send indication information based on the configurable processing mode. The indication information may be used to indicate to reconfigure a processing mode on the first node. The reconfigured processing mode belongs to the configurable processing mode.

With reference to the first aspect or any possible implementation of the first aspect, in another possible implementation, the current processing mode includes any one processing mode of forward, dispatch to control plane, discard, and ignore. Alternatively, the configurable processing mode includes any one or more processing modes of forward, dispatch to control plane, discard, and ignore. The extension header is carried in a packet, the processing mode of forward includes processing, by the first node, the extension header on a forwarding plane and forwarding the packet, the processing mode of dispatch to control plane includes sending, by the first node, the packet to a control plane to process the extension header, the processing mode of discard includes discarding the packet without identifying the extension header, and the processing mode of ignore includes forwarding the packet without processing the extension header.

It may be understood that, in the descriptions of the processing modes of forward, dispatch to control plane, discard, and ignore of the first node, an operation performed by the first node on the packet because the first node can process or cannot process the IPv6 extension header may also be understood as an operation performed on a packet or a data packet. The processing mode of dispatch to control plane may also be described as send to control plane or schedule (dispatch) to control plane, or as described in Section 4.8 of S. Deering, et al., "Internet Protocol, Version 6 (IPv6) Specification," IETF (RFC 8200), July 2017", referred to as assign to slow processing path for processing. The processing mode of discard may also be described as discarding, by the first node, the packet. The processing mode of ignore may alternatively mean transparently transmitting the packet.

With reference to the first aspect or any possible implementation of the first aspect, in another possible implementation, the current processing mode includes any one processing mode of forward, dispatch to control plane, discard, ignore, and configurable. The processing mode includes the current processing mode and the configurable processing mode, and when the current processing mode is configurable, it indicates that the first node supports processing of the IPv6 extension header in the configurable processing mode.

The first node can more accurately and variously advertise, by adding processing mode information used to indicate the extension header processing capability to the message, a processing mode supported by the first node, so that the second node serving as a receiver performs more refined network management or node control based on the processing mode information.

With reference to the first aspect or any possible implementation of the first aspect, in another possible implementation, before the first node sends the message to the second node, the first node generates the message.

With reference to the first aspect or any possible implementation of the first aspect, in another possible implementation, the first extension header processing capability information further includes a first type identifier, and the first extension header processing capability information is used to indicate a processing capability of the first node for the IPv6 extension header of a first type identified by the first type identifier. Optionally, the first type identifier may alternatively not be included in the first extension header processing capability information, but at another location in the message, and have a correspondence with the first extension header processing capability information. Optionally, a type of the IPv6 extension header may be an HBH, a DOH, or a segment routing header (SRH).

In some cases, the first node has different processing capabilities for different types of IPv6 extension headers. For example, a current processing mode of the first node for the HBH is forward, but a current processing mode for the DOH may be ignore. In the foregoing cases, the message may carry processing modes of the first node for different types of IPv6 extension headers, respectively, so that after receiving the message, the second node performs refined management or control based on the processing modes of the first node for different types of IPv6 extension headers.

When the message further includes second extension header processing capability information, the second extension header processing capability information may include a second type identifier. The second extension header processing capability information is used to indicate a processing capability of the first node for an IPv6 extension header of a second type.

With reference to the first aspect or any possible implementation of the first aspect, in another possible implementation, the processing capability includes a processing length, and the processing length is used to indicate a length of the extension header that can support for processing by the first node. Length value information used to indicate the processing length may also be carried in the extension header processing capability information.

After obtaining a length value of the extension header supported for processing by the first node, the second node can perform a corresponding operation based on the length value information. Assuming that the length value of the extension header supported for processing by the first node is a first value, when a length of an extension header that needs to be processed exceeds the first value, the second node may use a policy to control a length of an IPv6 extension header, so that the length of the IPv6 extension header in a packet sent by the second node or another node in the network to the first node does not exceed the first value, or the second node may not process an IPv6 extension header that exceeds the first value, but avoid selecting the first node as a node on a transmission path during route selection. The first node advertises information in the processing length aspect of the processing capability, so that the second node can perform refined management or control by integrating a plurality of aspects of the processing capability of the first node.

With reference to the first aspect or any possible implementation of the first aspect, in another possible implementation, the message is a BGP-link state (BGP-LS) message, a Path Computation Element Protocol (PCEP) LS report message, an Open Shortest Path First (OSPF) message, or an Intermediate System-to-Intermediate System (IS-IS) router message.

Further, the message is a BGP-LS message, and the first extension header processing capability information is carried in an opaque node attribute type-length-value (TLV) field in the BGP-LS message.

Alternatively, the message is a PCEP LS report message, and the first extension header processing capability information is carried in a TLV field in the PCEP LS report message.

Alternatively, the message is an OSPF router information (RI) opaque link state advertisement (LSA) message, and the first extension header processing capability information is carried in a capabilities TLV field in the OSPF RI opaque LSA message.

Alternatively, the message is an IS-IS router message, and the first extension header processing capability information is carried in a capability TLV field in the IS-IS router message.

With reference to the first aspect or any possible implementation of the first aspect, in another possible implementation, the first node may alternatively communicate with the second node by using a Network Configuration (NETCONF) protocol and a Yet Another Next Generation (YANG) model, to advertise the extension header processing capability.

The extension header processing capability information is carried in one of the foregoing manners, so that the first node can advertise the processing capability of the first node in cooperation with an existing mechanism, thereby ensuring inheritance and universality of use of a network protocol, and facilitating transfer of the message for advertising the processing capability.

According to a second aspect, this application provides a method for determining a processing capability. The method may be performed by a second node. The second node receives a message sent by a first node, and processes the received message. The method includes the second node receives the message sent by the first node. The message includes first extension header processing capability information. The second node obtains, based on the first extension header processing capability information, a processing capability of the first node for an IPv6 extension header. The second node may be a controller, or may be another network node that belongs to a same control domain as the first node, or the like.

According to the method for determining a processing capability that is provided in this application, the second node can obtain, based on a message sent by one or more nodes including the first node in a network, a processing capability of the one or more nodes for the IPv6 extension header, and perform packet forwarding path planning, determine a node with a specific capability, or the like based on the obtained processing capability, to ensure normal packet forwarding, improve network robustness, and improve network quality of service.

With reference to the second aspect, in a possible implementation, the second node determines, based on the obtained processing capability of the first node for the IPv6 extension header, whether the first node is a node configured to forward or receive a packet. The packet includes the IPv6 extension header.

After obtaining the processing capability of the first node, the second node may determine, based on the processing capability of the first node and with reference to a specific application scenario and a control policy, whether the first node is required for an operation or management, for example, the first node is required as a node for forwarding or receiving a packet. In a possible case, the first node may be a node configured to forward a packet during path planning of the second node. In another possible case, the first node may be a node that is determined by the second node based on the processing capability of the node and that is configured to implement a specific function, for example, a tail node in an iFIT detection domain.

With reference to the second aspect or any possible implementation of the second aspect, in another possible implementation, the processing capability includes a processing mode, and the processing mode is used to indicate a processing mode of the first node for the IPv6 extension header. The processing mode is used as an aspect of the processing capability, so that the second node can perform more refined network management or node control based on the processing mode supported by the first node.

With reference to the second aspect or any possible implementation of the second aspect, in another possible implementation, the second node determines, based on the processing mode indicating that the first node has a processing mode capable of processing the IPv6 extension header, that the first node is a node configured to forward or receive a packet.

With reference to the second aspect or any possible implementation of the second aspect, in another possible implementation, the processing mode includes a current processing mode and/or a configurable processing mode, and that the second node determines, based on the processing mode indicating that the first node has a processing mode capable of processing the IPv6 extension header, that the first node is a node configured to forward or receive a packet includes the following.

The second node determines, based on the current processing mode including forward or dispatch to control plane, that the first node is a node configured to forward or receive a packet.

Alternatively, the second node determines, based on the configurable processing mode including forward or dispatch to control plane, that the first node is a node configured to forward or receive a packet.

The processing mode of forward includes that the first node can process the extension header on a forwarding plane and forward the packet, and the processing mode of dispatch to control plane includes that the first node can send the packet to a control plane to process the extension header.

With reference to the second aspect or any possible implementation of the second aspect, in another possible implementation, the processing mode includes the current processing mode and the configurable processing mode, and that the second node determines, based on the configurable processing mode including forward or dispatch to control plane, that the first node is a node configured to forward or receive a packet includes that the second node obtains the configurable processing mode based on the current processing mode that is configurable. The second node determines, based on the configurable processing mode including forward or dispatch to control plane, that the first node is a node configured to forward or receive a packet.

It may be understood that, although in the foregoing scenario, it is determined, mainly based on the processing mode that is supported by the first node and that includes forward or dispatch to control plane, that the first node is a node configured to forward or receive a packet, in an actual application, the second node may alternatively determine, with reference to a specific application scenario and a control policy, whether the first node needs to be used as a node for forwarding or receiving a packet. When the second node determines that the first node is a node configured to forward or receive a packet, in some other cases, the processing mode supported by the first node may be another processing mode other than forward or dispatch to control plane. For example, when the second node is a controller and allows, during path computation, a proportion of nodes to ignore a packet including an extension header, although the processing mode supported by the first node is ignore, the first node is still determined as a node configured to transmit the packet. It may be further understood that, when determining whether to use the first node, the second node may further consider a factor such as resource usage of the first node in addition to the processing mode of the first node.

The second node may more flexibly and accurately perform operations such as path planning or node selection based on a supported processing mode sent by each node in the network, to ensure normal packet forwarding, and pertinently improve network quality of service.

With reference to the second aspect or any possible implementation of the second aspect, in another possible implementation, after the second node determines that the first node is a node configured to forward or receive a packet, the method includes that the second node publishes path information. The path information is used to indicate that a path used to transmit the packet includes the first node. Alternatively, the second node transmits the packet to the first node. The first node has a capability of processing the IPv6 extension header. In this way, the second node may use the processing capability of the first node based on an actual requirement. The use may mean that the second node determines, based on a currently enabled processing capability of the first node, that the first node is a node on a packet transmission path, or the second node configures, based on an obtained configurable processing capability of the first node and with reference to an actual requirement, a processing capability that needs to be enabled on the first node, and then transmit the packet by using the node that has the corresponding processing capability enabled. The second node may directly or indirectly configure the processing capability of the first node. For example, configuration information is directly carried in a notification message, to automatically configure the processing capability of the first node, or a message is sent to a system administrator or another control node in the network, to notify the system administrator or the other control node to configure the processing capability required by the first node.

With reference to the second aspect or any possible implementation of the second aspect, in another possible implementation, the second node determines, based on the processing mode indicating that the first node does not have a processing mode capable of processing the IPv6 extension header, that the first node is not configured to forward or receive a packet.

With reference to the second aspect or any possible implementation of the second aspect, in another possible implementation, the processing mode includes a current processing mode and/or a configurable processing mode, and that the second node determines, based on the processing mode indicating that the first node does not have a processing mode capable of processing the IPv6 extension header, that the first node is not configured to forward or receive a packet includes the following.

The second node determines, based on the current processing mode including discard or ignore, that the first node is not configured to forward or receive a packet.

Alternatively, the second node determines, based on the configurable processing mode including discard or ignore, that the first node is not configured to forward or receive a packet.

The processing mode of discard includes discarding the packet without identifying the extension header, the processing mode of ignore includes forwarding the packet without processing the extension header, and the configurable processing mode is used to indicate that the first node supports configuration of a processing mode for the extension header.

In this implementation, although the second node determines, based on the processing mode that is supported by the first node and that is discard or ignore, that the first node is not configured to transmit a packet, it may be understood that the second node may alternatively determine, based on an actual requirement and a control policy, that the first node supporting another processing mode is not configured to transmit a packet.

With reference to the second aspect or any possible implementation of the second aspect, in another possible implementation, the first extension header processing capability information includes a first type identifier, and the first extension header processing capability information is used to indicate a processing capability of the first node for the IPv6 extension header of a first type identified by the first type identifier.

With reference to the second aspect or any possible implementation of the second aspect, in another possible implementation, the processing capability further includes a processing length, and the processing length is used to indicate a length of the extension header that can support for processing by the first node.

With reference to the second aspect or any possible implementation of the second aspect, in another possible implementation, the message further includes second extension header processing capability information, and the method further includes that the second node obtains, based on the second extension header processing capability information, a processing capability of the first node for an IPv6 extension header of a second type.

With reference to the second aspect or any possible implementation of the second aspect, in another possible implementation, the message is a BGP-LS message, a PCEP LS report message, an OSPF message, or an IS-IS router message.

Further, the first extension header processing capability information is carried in an opaque node attribute TLV field in the BGP-LS message.

Alternatively, the message is a PCEP LS report message, and the first extension header processing capability information is carried in a TLV field in the PCEP LS report message.

Alternatively, the message is an OSPF RI opaque LSA message, and the first extension header processing capability information is carried in a capabilities TLV field in the OSPF RI opaque LSA message.

Alternatively, the message is an IS-IS router message, and the first extension header processing capability information is carried in a capability TLV field in the IS-IS router message.

With reference to the second aspect or any possible implementation of the second aspect, in another possible implementation, the processing mode includes a configurable processing mode, the configurable processing mode is used to indicate that the first node supports configuration of a processing mode for the IPv6 extension header, and the method includes that the second node sends a configuration message to the first node based on the configurable processing mode including a first processing mode. The configuration message is used to indicate to configure the processing mode of the first node for the IPv6 extension header to the first processing mode. In this way, the second node may configure a node in the network with reference to an actual requirement and a supported processing capability of the node for the IPv6 extension header, to improve flexibility and reliability of network transmission.

According to a third aspect, this application further provides a first node. The first node may be a network device, or may be a module or a function unit deployed in the network device. The first node includes a sending unit, and the sending unit sends a message to a second node. The message includes first extension header processing capability information, and the first extension header processing capability information is used to indicate a processing capability of the first node for an IPv6 extension header.

The first node provided in this application can notify the processing capability of the first node for the IPv6 extension header to a controller or another forward node in a same control domain, so that the second node serving as a receive node can perform subsequent operations such as path planning and node selection based on the capability of the first node, to ensure normal packet forwarding.

With reference to the third aspect, in a possible implementation, the processing capability includes a processing mode, and the processing mode is used to indicate a processing mode of the first node for the IPv6 extension header. The processing mode belongs to an aspect of the processing capability, and is used to indicate the processing mode of the first node for the IPv6 extension header. The processing mode may also be referred to as an action, a behaving manner, an operation manner, or the like.

With reference to the third aspect or any possible implementation of the third aspect, in another possible implementation, the processing mode includes one or more of a current processing mode and a configurable processing mode.

When the processing mode includes the current processing mode, the current processing mode may be used to indicate a processing mode that currently has been configured on the first node for the extension header.

When the processing mode includes the configurable processing mode, the configurable processing mode may be used to indicate one or more processing modes that are allowed to be configured on the first node for the extension header.

When the processing mode includes only the current processing mode, the second node generally cannot change the current processing mode. When the processing mode includes only the configurable processing mode, or includes the configurable processing mode in addition to the current processing mode, the second node may send indication information based on the configurable processing mode. The indication information may be used to indicate to reconfigure a processing mode on the first node. The reconfigured processing mode belongs to the configurable processing mode.

With reference to the third aspect or any possible implementation of the third aspect, in another possible implementation, the current processing mode includes any one processing mode of forward, dispatch to control plane, discard, and ignore. Alternatively, the configurable processing mode includes any one or more processing modes of forward, dispatch to control plane, discard, and ignore. The extension header is carried in a packet, the processing mode of forward includes processing, by the first node, the extension header on a forwarding plane and forwarding the packet, the processing mode of dispatch to control plane includes sending, by the first node, the packet to a control plane to process the extension header, the processing mode of discard includes discarding the packet without identifying the extension header, and the processing mode of ignore includes forwarding the packet without processing the extension header.

With reference to the third aspect or any possible implementation of the third aspect, in another possible implementation, the current processing mode includes any one processing mode of forward, dispatch to control plane, discard, ignore, and configurable. The processing mode includes the current processing mode and the configurable processing mode, and when the current processing mode is configurable, it indicates that the first node supports processing of the IPv6 extension header in the configurable processing mode.

The first node can more accurately and variously advertise, by adding processing mode information used to indicate the extension header processing capability to the message, a processing mode supported by the first node, so that the second node serving as a receiver performs more refined network management or node control based on the processing mode information.

With reference to the third aspect or any possible implementation of the third aspect, in another possible implementation, the first node further includes a generation unit, and before the sending unit sends the message to the second node, the generation unit is configured to generate the message.

With reference to the third aspect or any possible implementation of the third aspect, in another possible implementation, the first extension header processing capability information further includes a first type identifier, and the first extension header processing capability information is used to indicate a processing capability of the first node for the IPv6 extension header of a first type identified by the first type identifier. The message may carry processing modes of the first node for different types of IPv6 extension headers, respectively, so that after receiving the message, the second node performs refined management or control based on the processing modes of the first node for different types of IPv6 extension headers.

When the message further includes second extension header processing capability information, the second extension header processing capability information may include a second type identifier. The second extension header processing capability information is used to indicate a processing capability of the first node for an IPv6 extension header of a second type.

With reference to the third aspect or any possible implementation of the third aspect, in another possible implementation, the processing capability includes a processing length, and the processing length is used to indicate a length of the extension header that can support for processing by the first node. Length value information used to indicate the processing length may also be carried in the extension header processing capability information. The first node advertises information in the processing length aspect of the processing capability, so that the second node can perform refined management or control by integrating a plurality of aspects of the processing capability of the first node.

After obtaining a length value of the extension header supported for processing by the first node, the second node can perform an operation based on the length value information. Assuming that the length value of the extension header supported for processing by the first node is a first value, when a length of an extension header that needs to be processed exceeds the first value, the second node may use a policy to control a length of an IPv6 extension header, so that the length of the IPv6 extension header in a packet sent to the first node does not exceed the first value, or the second node may not process an IPv6 extension header that exceeds the first value, but avoid selecting the first node as a node on a transmission path during route selection.

With reference to the third aspect or any possible implementation of the third aspect, in another possible implementation, the message is a BGP-LS message, a PCEP LS report message, an OSPF message, or an IS-IS router message.

Further, the message is a BGP-LS message, and the first extension header processing capability information is carried in an opaque node attribute TLV field in the BGP-LS message.

Alternatively, the message is a PCEP LS report message, and the first extension header processing capability information is carried in a TLV field in the PCEP LS report message.

Alternatively, the message is an OSPF RI opaque LSA message, and the first extension header processing capability information is carried in a capabilities TLV field in the OSPF RI opaque LSA message.

Alternatively, the message is an IS-IS router message, and the first extension header processing capability information is carried in a capability TLV field in the IS-IS router message.

With reference to the third aspect or any possible implementation of the third aspect, in another possible implementation, the first node may alternatively communicate with the second node by using a NETCONF Protocol and a YANG model, to advertise the extension header processing capability.

The extension header processing capability information is carried in one of the foregoing manners, so that the first node can advertise the processing capability of the first node in cooperation with an existing mechanism, thereby ensuring inheritance and universality of use of a network protocol.

According to a fourth aspect, this application further provides a second node. The second node may be a network device, or may be a module or a function unit deployed in the network device. The second node includes a receiving unit, a processing unit, and an obtaining unit. The receiving unit is configured to receive a message sent by a first node. The message includes first extension header processing capability information. The processing unit is configured to process the received message. The obtaining unit is configured to obtain, based on the first extension header processing capability information, a processing capability of the first node for an IPv6 extension header. The second node may be a controller, or may be another network node that belongs to a same control domain as the first node, or the like.

The second node provided in this application can obtain, based on a message sent by one or more nodes including the first node in a network, a processing capability of the one or more nodes for the IPv6 extension header, and perform packet forwarding path planning, determine a node with a specific capability, or the like based on the obtained processing capability, to ensure normal packet forwarding, improve network robustness, and improve network quality of service.

With reference to the fourth aspect, in a possible implementation, the second node further includes a determining unit, and the determining unit is configured to determine, based on the obtained processing capability of the first node for the IPv6 extension header, whether the first node is a node configured to forward or receive a packet. The packet includes the IPv6 extension header.

With reference to the fourth aspect or any possible implementation of the fourth aspect, in another possible implementation, the processing capability includes a processing mode, and the processing mode is used to indicate a processing mode of the first node for the IPv6 extension header. The processing mode is used as an aspect of the processing capability, so that the second node can perform more refined network management or node control based on the processing mode supported by the first node.

With reference to the fourth aspect or any possible implementation of the fourth aspect, in another possible implementation, the determining unit determines, based on the processing mode indicating that the first node has a processing mode capable of processing the IPv6 extension header, that the first node is a node configured to forward or receive a packet.

With reference to the fourth aspect or any possible implementation of the fourth aspect, in another possible implementation, the processing mode includes a current processing mode and/or a configurable processing mode, and that the determining unit determines, based on the processing mode indicating that the first node has a processing mode capable of processing the IPv6 extension header, that the first node is a node configured to forward or receive a packet includes the following.

The determining unit determines, based on the current processing mode including forward or dispatch to control plane, that the first node is a node configured to forward or receive a packet.

Alternatively, the determining unit determines, based on the configurable processing mode including forward or dispatch to control plane, that the first node is a node configured to forward or receive a packet.

The processing mode of forward includes that the first node can process the extension header on a forwarding plane and forward the packet, and the processing mode of dispatch to control plane includes that the first node can send the packet to a control plane to process the extension header.

With reference to the fourth aspect or any possible implementation of the fourth aspect, in another possible implementation, the processing mode includes the current processing mode and the configurable processing mode, and that the determining unit determines, based on the configurable processing mode including forward or dispatch to control plane, that the first node is a node configured to forward or receive a packet includes that the obtaining unit obtains the configurable processing mode based on the current processing mode that is configurable. The determining unit determines, based on the configurable processing mode including forward or dispatch to control plane, that the first node is a node configured to forward or receive a packet.

The second node may more flexibly and accurately perform operations such as path planning or node selection based on a supported processing mode sent by each node in the network, to ensure normal packet forwarding, and pertinently improve network quality of service.

With reference to the fourth aspect or any possible implementation of the fourth aspect, in another possible implementation, the second node further includes a sending unit, and after the determining unit determines that the first node is a node configured to forward or receive a packet, the sending unit is configured to send path information. The path information is used to indicate that a path used to transmit the packet includes the first node. Alternatively, the sending unit sends the packet to the first node. The first node has a capability of processing the IPv6 extension header. In this way, the second node may use the processing capability of the first node based on an actual requirement.

With reference to the fourth aspect or any possible implementation of the fourth aspect, in another possible implementation, the second node determines, based on the processing mode indicating that the first node does not have a processing mode capable of processing the IPv6 extension header, that the first node is not configured to forward or receive a packet.

With reference to the fourth aspect or any possible implementation of the fourth aspect, in another possible implementation, the processing mode includes a current processing mode and/or a configurable processing mode, and that the second node determines, based on the processing mode indicating that the first node does not have a processing mode capable of processing the IPv6 extension header, that the first node is not configured to forward or receive a packet includes the following.

The second node determines, based on the current processing mode including discard or ignore, that the first node is not configured to forward or receive a packet.

Alternatively, the second node determines, based on the configurable processing mode including discard or ignore, that the first node is not configured to forward or receive a packet.

The processing mode of discard includes discarding the packet without identifying the extension header, the processing mode of ignore includes forwarding the packet without processing the extension header, and the configurable processing mode is used to indicate that the first node supports configuration of a processing mode for the extension header.

With reference to the fourth aspect or any possible implementation of the fourth aspect, in another possible implementation, the first extension header processing capability information includes a first type identifier, and the first extension header processing capability information is used to indicate a processing capability of the first node for the IPv6 extension header of a first type identified by the first type identifier.

With reference to the fourth aspect or any possible implementation of the fourth aspect, in another possible implementation, the processing capability further includes a processing length, and the processing length is used to indicate a length of the extension header that can support for processing by the first node.

With reference to the fourth aspect or any possible implementation of the fourth aspect, in another possible implementation, the message further includes second extension header processing capability information. The second node obtains, based on the second extension header processing capability information, a processing capability of the first node for an IPv6 extension header of a second type.

With reference to the fourth aspect or any possible implementation of the fourth aspect, in another possible implementation, the message is a BGP-LS message, a PCEP LS report message, an OSPF message, or an IS-IS router message.

Further, the first extension header processing capability information is carried in an opaque node attribute TLV field in the BGP-LS message.

Alternatively, the message is a PCEP LS report message, and the first extension header processing capability information is carried in a TLV field in the PCEP LS report message.

Alternatively, the message is an OSPF RI opaque LSA message, and the first extension header processing capability information is carried in a capabilities TLV field in the OSPF RI opaque LSA message.

Alternatively, the message is an IS-IS router message, and the first extension header processing capability information is carried in a capability TLV field in the IS-IS router message.

With reference to the fourth aspect or any possible implementation of the fourth aspect, in another possible implementation, the processing mode includes a configurable processing mode. The configurable processing mode is used to indicate that the first node supports configuration of a processing mode for the IPv6 extension header. The second node sends a configuration message to the first node based on the configurable processing mode including a first processing mode. The configuration message is used to indicate to configure the processing mode of the first node for the IPv6 extension header to the first processing mode.

According to a fifth aspect, this application provides a first node. The node may be a network device, and further includes a processor configured to implement the method for determining a processing capability according to any one of the first aspect or the possible implementations of the first aspect. The node may further include a memory. The memory is coupled to the processor. When the processor executes instructions stored in the memory, the method for determining a processing capability according to any one of the first aspect or the possible implementations of the first aspect may be implemented. The node may further include a communications interface. The communications interface is used by the apparatus to communicate with another device. For example, the communications interface may be a transceiver, a circuit, a bus interface, or a communications interface of another type.

It may be understood that, in this application, the instructions in the memory may be prestored, or may be stored after downloaded from the Internet when the node is used. A source of the instructions in the memory is not uniquely limited in this application.

In a possible implementation, the first node includes the processor configured to obtain a message, where the message includes first extension header processing capability information, and the first extension header processing capability information is used to indicate a processing capability of the first node for an IPv6 extension header, and the communications interface configured to send the message to a second node.

In this implementation, a manner in which the first node obtains the message may be implemented by reading and executing a program instruction in the memory. The memory and the processor are coupled. The coupling may be direct or indirect coupling between components, units, or modules, for example, may be direct line connection or indirect communication connection, whose connection manner may be electrical, mechanical, or other forms, and is used for information exchange between the components, the units, or the modules.

According to a sixth aspect, this application provides a second node. The node may include a processor configured to implement the method for determining a processing capability according to any one of the second aspect or the possible implementations of the second aspect. The node may further include a memory. The memory is coupled to the processor. When the processor executes instructions stored in the memory, the method for determining a processing capability according to any one of the second aspect or the possible implementations of the second aspect may be implemented. The node may further include a communications interface. The communications interface is used by the apparatus to communicate with another device. For example, the communications interface may be a transceiver, a circuit, a bus interface, or a communications interface of another type.

In a possible implementation, the second node includes the communications interface configured to receive a message sent by a first node, where the message includes first extension header processing capability information, and the processor configured to obtain, based on the first extension header processing capability information in the message, a processing capability of the first node for an IPv6 extension header. In this implementation, a manner in which the second node obtains the processing capability of the first node may be implemented by reading and executing a program instruction in the memory, and the memory and the processor are coupled.

According to a seventh aspect, a network system is provided. The network system includes a first node and a second node. The first node may be the first node in any one of the third aspect or the possible implementations of the third aspect, or may be the first node in any one of the fifth aspect or the possible implementations of the fifth aspect. The second node may be the second node in any one of the fourth aspect or the possible implementations of the fourth aspect, or may be the second node in any one of the sixth aspect or the possible implementations of the sixth aspect.

According to an eighth aspect, an embodiment of this application further provides a computer readable storage medium, including instructions. When the instructions are run on a computer, the computer is enabled to perform the method for determining a processing capability according to any one of the first aspect or the possible implementations of the first aspect, or the computer is enabled to perform the method for determining a processing capability according to any one of the second aspect or the possible implementations of the second aspect.

According to a ninth aspect, an embodiment of this application further provides a computer program product. When the computer program product runs on a computer, the computer is enabled to perform the method for determining a processing capability according to any one of the first aspect or the possible implementations of the first aspect, or the computer is enabled to perform the method for determining a processing capability according to any one of the second aspect or the possible implementations of the second aspect.

According to a tenth aspect, an embodiment of this application provides a chip system. The chip system includes a processor, and may further include a memory, to implement a function of the first node in any one of the first aspect or the possible implementations of the first aspect. The chip system may include a chip, or may include a chip and another discrete device.

According to an eleventh aspect, an embodiment of this application provides a chip system. The chip system includes a processor, and may further include a memory, to implement a function of the second node in any one of the second aspect or the possible implementations of the second aspect. The chip system may include a chip, or may include a chip and another discrete device.

Solutions provided in the third aspect to the eleventh aspect are used to implement the methods for determining a processing capability provided in the first aspect and the second aspect, and therefore can achieve same beneficial effects as the first aspect and the second aspect. Details are not described herein again.

DESCRIPTION OF EMBODIMENTS

Figure 1:
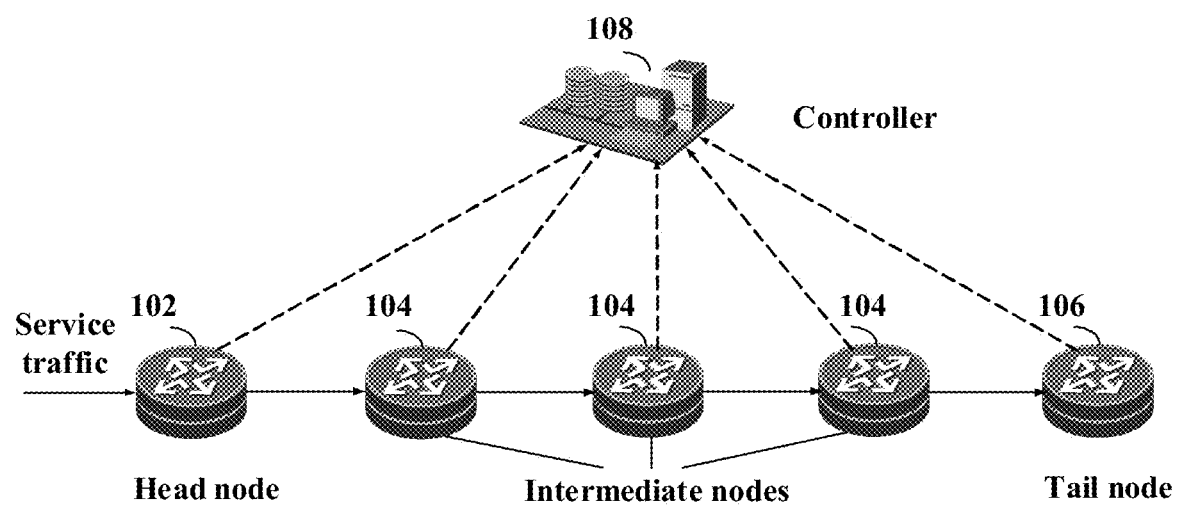
FIG. 1 is a schematic diagram of a structure of a communications network according to an embodiment of this application.

In the specification, claims, and accompanying drawings of this application, terms such as "first", "second", and "third" are intended to distinguish between different objects but not to limit a particular order.

In this application, words such as "example" or "for example" are used to give an example, an illustration, or descriptions. Any embodiment or design scheme described as an "example" or with "for example" in the embodiments of this application should not be explained as being more preferred or having more advantages than another embodiment or design scheme. Exactly, use of the word such as "example" or "for example" is intended to present a related concept in a specific manner for ease of understanding.

In the descriptions of this application, "l" represents an "or" relationship between associated objects unless otherwise specified. For example, A/B may represent A or B. The term "and/or" in this application indicates only an association relationship for describing associated objects and indicates that three relationships may exist. For example, A and/or B may represent the following three cases: only A exists, both A and B exist, and only B exists, where A and B may be singular or plural. In addition, in the descriptions of this application, "a plurality of" means two or more than two, unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In this application, "at least one" may also be described as "one or more", and "a plurality of" may be two, three, four, or more. This is not limited in this application.

The following describes technical solutions in embodiments of this application with reference to accompanying drawings. The network architecture and the service scenario described in the embodiments of this application are intended to describe the technical solutions in the embodiments of this application more clearly, and do not constitute a limitation on a unique scenario of the technical solutions provided in the embodiments of this application. A person of ordinary skill in the art knows that, with evolution of the network architecture and emergence of new service scenarios, the technical solutions provided in the embodiments of this application are also applicable to similar technical problems in another scenario.

A network structure for implementing end-to-end flow transmission generally includes three types of nodes, which are a head node, an intermediate node, and a tail node, respectively. The head node may also be referred to as an ingress node. The intermediate node may also be referred to as a forward node. The tail node may also be referred to as an egress node. In the network structure, end-to-end transmission from a head node to a tail node may be implemented for a traffic flow. It may be understood that a plurality of nodes of different types above may be located on a same network device, or may be located on different network devices.

Abundant functional applications may be implemented in a network by using an optional extension header in an IPv6 protocol. In a possible application scenario, an iFIT technology may be used to implement in-situ flow detection. The iFIT technology is a detection solution in which a traffic flow can be measured hop by hop, to obtain performance indicators such as a real packet loss rate and a delay of an IP network. A plurality of nodes on an end-to-end path may send collected detection information to a controller in the network, and the controller determines a network status based on a plurality of pieces of received detection information, so that a user can perform service adjustment in time when network performance deteriorates, and position a faulty node in time. To achieve the foregoing objective, the head node may add iFIT detection information to a packet that belongs to the traffic flow, where the iFIT detection information includes feature tags such as a packet loss and a delay, to indicate one or more intermediate nodes and the tail node that receive the packet to collect statistics on packet loss and delay information of the traffic flow, and send statistical data obtained through measurement to the controller, so that the controller implements functions such as network running status obtaining and path computation. The iFIT detection information may be carried in an IPv6 extension header.

In another possible application scenario, an APN6 system framework implements a solution of providing differentiated service requirements on a bearer network, in which service requirements of different applications are sensed in a fine-grained manner, so that the network can provide corresponding service level agreement (SLA) assurance for a traffic flow. In an APN6 architecture, an application or service requirement parameter may be carried in an IPv6 extension header of a traffic flow packet, so that a node that receives the packet can deploy or adjust a corresponding network resource based on the requirement parameter carried in the extension header, thereby providing refined operation of an aware application, and implementing network services such as resource/service isolation, deterministic latency assurance, cloud-and-network synergy, intelligent network operation and maintenance monitoring, and visualization.

In an existing network, some nodes do not support processing of the IPv6 extension header because different nodes support different protocols and have processing capabilities. However, when computing a transmission path of a traffic flow packet, a controller does not consider a processing capability of a network device on the path for the IPv6 extension header. In one case, when a network device that does not have an extension header processing capability receives a packet that carries the IPv6 extension header, the packet is directly discarded, or the packet is directly forwarded to a next-hop network node without performing any processing on the extension header in the packet. As a result, a traffic flow may have continuous packet losses, or an effect of in-situ flow detection cannot be effectively achieved. In another case, a network node can process the IPv6 extension header, but the processing cannot be directly performed on a forwarding plane. Instead, the packet needs to be first sent to a control plane, and then the control plane processes the extension header, which reduces a forwarding rate of the packet. Particularly, in some cases, to prevent a processor of the control plane from being pressured by frequently sending packets to the control plane, the network node limits a packet sending speed, thereby causing a packet loss.

Based on this, the embodiments of this application provide a method for sending information. The information is used to advertise a processing capability of a local node for an IPv6 extension header, so that a network node, such as a controller or a head node, that receives the information performs operations such as route selection or node capability configuration based on the advertised processing capability of the local node for the IPv6 extension header, thereby effectively ensuring normal processing and forwarding of a traffic flow packet, and improving network running robustness and security.

The following describes implementations of the embodiments of this application in detail with reference to the accompanying drawings.

The method for sending information that is provided in the embodiments of this application may be applied to various types of communications networks. The communications network may also be referred to as a data network or a computer network. A type of the communications network is not limited in this application. For example, the communications network may be any one of the following types of networks: a campus network, a data center network, a firewall system network, a data network based on routing transmission, a 5th generation mobile communication technology (5G) bearer network, and a multicast network.

FIG. 1 shows a composition structure of a communications network for implementing traffic flow transmission. The communications network may include a head node 102, a plurality of intermediate nodes 104, and a tail node 106 for transmitting a traffic flow. The head node 102, the intermediate nodes 104, and the tail node 106 each may be an independent network device, for example, a switch, a router, or another network device having a packet forwarding capability, or may be a forwarding unit in a network device. When a node is a forwarding unit in a network device, the network device may further include one or more other nodes, and a function type of the one or more other nodes may be the same as or different from that of the node.

The communications network may further include a controller 108. The controller 108 may be a server having management and computing capabilities or a network device of another type. Further, the controller 108 may be configured to manage the head node 102, the plurality of intermediate nodes 104, and the tail node 106, and analyze and process data sent by a corresponding node, to implement functions such as path planning, resource scheduling, and device configuration. In other cases, the communications network may alternatively not include the controller 108, and another node, for example, the head node 102, on a traffic flow transmission path performs a function such as path computation or device selection.

It may be understood that the communications network shown in FIG. 1 is merely used as a possible example, and a specific structure and scale of the communications network for traffic flow transmission may be configured based on a requirement.

Figure 2:
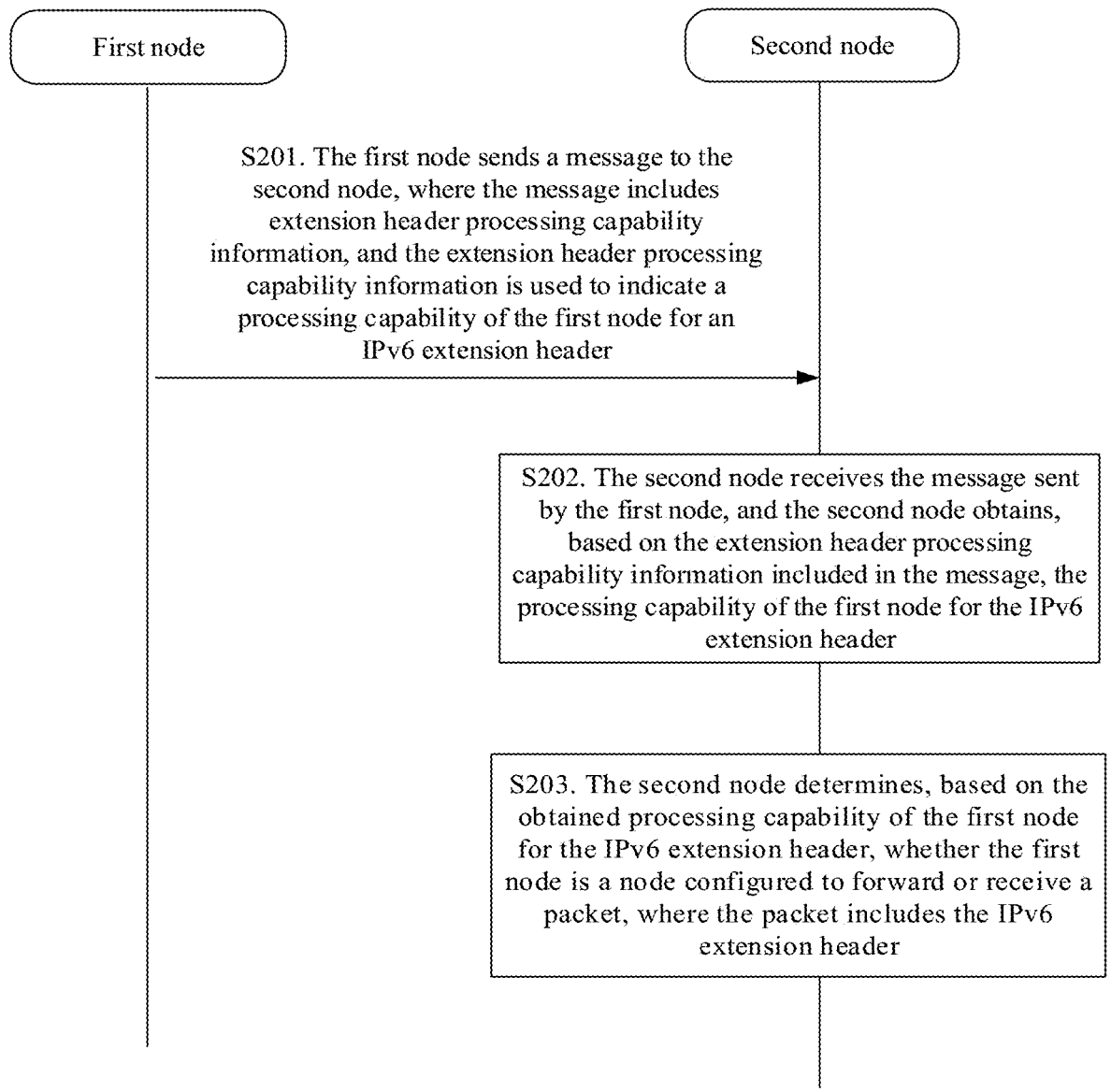
FIG. 2 is a schematic flowchart of sending and processing a message according to an embodiment of this application.

An embodiment of this application provides a method for sending information, which is applied to an interaction process between a first node and a second node, as shown in FIG. 2. The first node may be, for example, the head node 102, the intermediate node 104, or the tail node 106 shown in FIG. 1, and the second node may be the controller 108. Alternatively, the second node may be the head node 102, and in this case, the first node may be the intermediate node 104 or the tail node 106. Alternatively, the first node and the second node may be nodes at another locations that are configured based on a requirement and that need to perform corresponding functions. The method may include the following steps.

S201. The first node sends a message to the second node. The message includes extension header processing capability information, and the extension header processing capability information is used to indicate a processing capability of the first node for an IPv6 extension header.

The first node sends the message to the second node. The message may be carried in the extension header processing capability information, and sent by the first node to advertise the processing capability of the first node for the IPv6 extension header. Specific content carried in the extension header processing capability information may include one or more of information such as an IPv6 extension header processing mode, an IPv6 extension header type, and an IPv6 extension header length supported for processing. Next, this embodiment is explained in detail.

The content carried in the extension header processing capability information may be the IPv6 extension header processing mode. The processing mode belongs to an aspect of the processing capability, and is used to indicate a processing mode of the first node for the IPv6 extension header. The processing mode may be, for example, a current processing mode and/or a configurable processing mode. The processing mode may include the following several implementation forms.

Form 1: The extension header processing capability information includes the current processing mode.

The extension header processing capability information sent by the first node includes at least the current processing mode. The current processing mode is a manner in which the first node currently processes the IPv6 extension header, for example, a processing mode that has been configured by an administrator for the first node and is currently maintained. Further, the current processing mode may include, for example, any one of forward, dispatch to control plane, discard, and ignore. The processing mode may also be referred to as an action, a behaving manner, an operation manner, or the like. When the first node sends a traffic flow, the IPv6 extension header may be carried in a packet belonging to the traffic flow. The processing mode of forward includes that the first node can process the extension header on a forwarding plane and forward the packet. The processing mode of dispatch to control plane includes that the first node can send the packet to a control plane to process the extension header. The processing mode of discard includes discarding the packet without identifying the extension header. The processing mode of ignore includes forwarding the packet without processing the extension header. The configurable processing mode is used to indicate that the first node supports configuration of a processing mode for the extension header. For the processing mode of ignore, although the node does not process the extension header, because an IPv6 packet header actually includes another encapsulation header or information of another type in addition to the extension header, in some cases, the node may not process the extension header, but process the other encapsulation header or the information of the another type, and then forward the packet. In the descriptions of the processing modes of forward, dispatch to control plane, discard, and ignore of the first node, an operation performed by the first node on the packet because the first node can process or cannot process the IPv6 extension header may also be understood as an operation performed on a packet or a data packet.

When receiving the extension header processing capability information advertised by the first node in Form 1, the second node may learn that the first node enables one specific processing mode of forward, dispatch to control plane, discard, and ignore. In a specific example, the extension header processing capability information may use a 3-bit flag to indicate the current processing mode of the first node for the IPv6 extension header. For example, 000 indicates forward, 001 indicates dispatch to control plane, 010 indicates discard, and 011 indicates ignore. It may be understood that the extension header processing capability information used to advertise the processing mode may alternatively be indicated in another form. For example, a 4-bit bitmap is defined, and each bit corresponds to a different processing mode. In this case, 1000 indicates forward, 0100 indicates dispatch to control plane, 0010 indicates discard, and 0001 indicates ignore. A specific presentation manner of the extension header processing capability information is not uniquely limited in this embodiment, provided that the second node can determine the current processing mode of the first node based on the information.

Form 2: The extension header processing capability information includes the configurable processing mode.

The extension header processing capability information sent by the first node includes at least the configurable processing mode, and the configurable processing mode is a processing mode supported by the first node for the IPv6 extension header. The configurable processing mode is used to indicate that the first node supports configuration of a processing mode for the IPv6 extension header. The current processing mode is a specific processing mode locally set on the first node, and the second node may learn the specific processing mode, but cannot configure or change the processing mode. The configurable processing mode is different from the current processing mode, and the configurable processing mode indicates a processing mode supported by the first node for the IPv6 extension header. One or more processing modes may be supported by the first node, and the second node may be allowed to configure, based on a scenario requirement, an actual processing mode of the first node for the extension header. The configuration may be as follows. The second node sends a configuration message to automatically configure the first node. Alternatively, the second node sends a notification message to notify a system administrator, and the system administrator manually configures the first node, or the like. In a specific example, the extension header processing capability information may use a 4-bit bitmap to indicate the configurable processing mode of the first node for the IPv6 extension header, for example, in a sequence from a high-order bit to a low-order bit, the first bit indicates whether forward is supported, the second bit indicates whether dispatch to control plane is supported, the third bit indicates whether discard is supported, and the fourth bit indicates whether ignore is supported. When a corresponding bit is set to 1, it indicates that a corresponding processing mode is supported. When the corresponding bit is set to 0, it indicates that the corresponding processing mode is not supported. In this case, in an example, 1101 indicates that the first node supports three processing modes:

forward, dispatch to control plane, and ignore. After receiving the extension header processing capability information including 1101, the second node may set, based on a requirement, the extension header processing mode of the first node to one of forward, dispatch to control plane, and ignore. The foregoing example is merely used as a possible implementation choice, and other representation forms may alternatively be set. For example, the second node prestores codes corresponding to different configurable manner combinations. After receiving a corresponding code sent by the first node, the second node may determine, based on a correspondence between the code and a configurable manner combination, a configurable manner supported by the first node. For example, a code 3 indicates that a configurable manner combination supported by the first node is forward, dispatch to control plane, and ignore. It may be understood that during actual design, several reserved bits may be further reserved for subsequent extension of another configurable processing mode. A specific presentation manner of the extension header processing capability information is not uniquely limited in this embodiment, provided that the second node can determine the configurable processing mode of the first node based on the information.

Form 3: The extension header processing capability information includes the current processing mode and the configurable processing mode.

The extension header processing capability information may alternatively include both the current processing mode and the configurable processing mode.

In a possible case, to ensure consistency between implementation forms, for example, in addition to the current processing mode including the forward, dispatch to control plane, discard, and ignore modes mentioned in Form 1, a configurable mode may be further included. For example, in the flag in Form 1, the configurable mode may be represented by, for example, 100, to indicate that the first node supports a role such as another node or an administrator in reconfiguring the processing mode supported by the first node for the IPv6 extension header. After receiving the message including the extension header processing capability information, when the second node finds that a value of the flag used to identify the current processing mode is 100, the second node determines that the first node supports configuration of the processing mode. Therefore, the second node obtains bitmap information, for example, 1101, used to identify the configurable processing mode, to determine a configurable processing mode actually supported by the first node. In other cases, if the current processing mode is not the configurable mode, but one of forward, dispatch to control plane, discard, and ignore, a value of the configurable processing mode part may be a default value, for example, 0000, or any value.

In another possible case, the current processing mode may be used to indicate a processing mode currently configured on the first node, for example, may be any one of forward, dispatch to control plane, discard, and ignore. In addition, the first node may further advertise, by using a message, a configurable processing mode supported by the first node, which may be, for example, any one or more of forward, dispatch to control plane, discard, and ignore. In this way, in a possible example, the processing mode advertised by the first node is, for example, (001, 1111), indicating that the current processing mode of the first node is dispatch to control plane, but may be supported in reconfiguration to any one of forward, dispatch to control plane, discard, and ignore. It may be understood that, in this example, if the second node needs to configure the extension header processing mode of the first node to dispatch to control plane, because the current processing mode of the first node is dispatch to control plane, the second node does not need to perform any actual operation on the first node. It may be understood that, in this example, the first node may alternatively determine, in advance through comparison, a difference between the current processing mode of the first node and the supported configurable processing mode, and directly send (001, 1111) when advertising the processing mode to the second node.

The foregoing form 1 to 3 are mainly used to explain how the information used to indicate the processing mode of the first node for the IPv6 extension header is carried, but is not distinguished based on specific types of IPv6 extension headers. The IPv6 extension headers may include a plurality of different types, such as an HBH, a DOH, and an SRH, or various other possible types of extension headers. It may be understood that, in some cases, the first node has different processing capabilities for different types of IPv6 extension headers. For example, a current processing mode of the first node for the HBH is forward, but a current processing mode for the DOH may be ignore. In the foregoing cases, the message may carry processing modes of the first node for different types of IPv6 extension headers, respectively, so that after receiving the message, the second node performs refined management and control based on the processing modes of the first node for different types of IPv6 extension headers. In an example, the extension header processing capability information may further include an extension header type, and the extension header type is used to carry a type identifier of an IPv6 extension header. Different type identifiers respectively correspond to different IPv6 extension header types, to distinguish between the IPv6 extension header types. In an example, an 8-bit flag may be used to indicate the IPv6 extension header types. For a specific definition, for example, refer to a related definition about an IPv6 Next Header in RFC 8200. In another example, a flag with another quantity of bits may be used to indicate the extension header types, or a correspondence between a type identifier and an extension header type is determined by using a mapping relationship table, or the like.

For example, a type identifier A represents the HBH type, a type identifier B represents the DOH type, and a type identifier C represents the SRH type. Assuming that the first node identifies the IPv6 extension header processing mode in form 1, the extension header processing capability information sent by the first node to the second node may include three correspondences, for example, (A, 000), (B, 011), and (C, 010). In the foregoing manner, the first node advertises the second node that a processing mode of the first node for the HBH is forward, a processing mode for the DOH is ignore, and a processing mode for the SRH is discard.

Assuming that the first node identifies the IPv6 extension header processing mode in Form 3, the extension header processing capability information sent by the first node to the second node may include three correspondences, for example, (A, 100, 1101), (B, 011, 0000), and (C, 100, 0100). In the foregoing manner, the first node advertises the second node that the first node supports a configurable processing mode for the HBH, and supports configuration to the processing mode of forward, dispatch to control plane, or ignore, a current processing mode for the DOH is ignore, and the first node supports a configurable processing mode for the SRH, and supports configuration to the processing mode of dispatch to control plane. The foregoing correspondences are merely used as an example of a presentation form. In an actual application, three consecutive fields may be used to represent the correspondences, and the three consecutive fields sequentially represent a type identifier, a current processing mode, and a configurable processing mode.

It may be understood that, in some cases, the extension header processing capability information may alternatively not include the extension header type identifier. For example, processing of only one specific type of IPv6 extension headers is supported in an entire network or control domain. Alternatively, the first node and the second node themselves learn, through pre-negotiation, a specific type of extension headers to which the current advertised processing capability information is directed.

In addition, in a possible case, even if the first node can process an IPv6 extension header of a specific type that is carried in the packet, when a length of the extension header exceeds a threshold, the packet may still be discarded because the length of the extension header is excessively long. As a result, the packet cannot be processed normally. To avoid occurrence of such a problem as far as possible, the extension header processing capability information may further include extension header length information. That is, the processing capability includes a processing length, and the processing length is used to indicate a length of the extension header that can be supported for processing by the first node. In a specific implementation, for example, a correspondence between a length value of an extension header that can be processed and a code is preset, so that the second node may determine, by using the code carried in the extension header length information, a length of an extension header that can be processed by the first node. Alternatively, a flag with a specific quantity of bits (for example, 8 bits) is defined, to carry a length value of an extension header that can be processed. Further, for example, the length value of the extension header that can be processed may be determined in a definition manner about an HBH extension header length (Hdr Ext Len) in Section 4.3 of RFC 8200. When the message sent by the first node can be used to advertise a processing capability for one or more specific types of IPv6 extension headers, the message may carry one or more pieces of length information of extension headers that can be processed. The one or more pieces of length information respectively correspond to the one or more specific types of IPv6 extension headers.

It may be understood that an extension header length advertised by the first node may be a maximum length of an extension header that can be processed by the first node, or may be a specified length actually allowed for processing. The specified length actually allowed for processing may be comprehensively determined based on factors such as a service requirement and resource allocation, and may be less than the maximum length. It may be further understood that the processing length may be separately advertised as one aspect of the processing capability. The second node may determine the processing capability of the first node based only on the processing length, or may determine the processing capability of the first node based on the processing length and the processing mode.

After obtaining the length value of the extension header supported for processing by the first node, the second node can perform an operation based on the length value information. Assuming that the length value of the extension header supported for processing by the first node is a first value, when a length of an extension header that needs to be processed exceeds the first value, the second node may use a policy to control a length of an IPv6 extension header, so that the length of the IPv6 extension header in a packet sent to the first node does not exceed the first value, or the second node may not process an IPv6 extension header that exceeds the first value, but avoid selecting the first node as a node on a transmission path during route selection.

Figure 3:
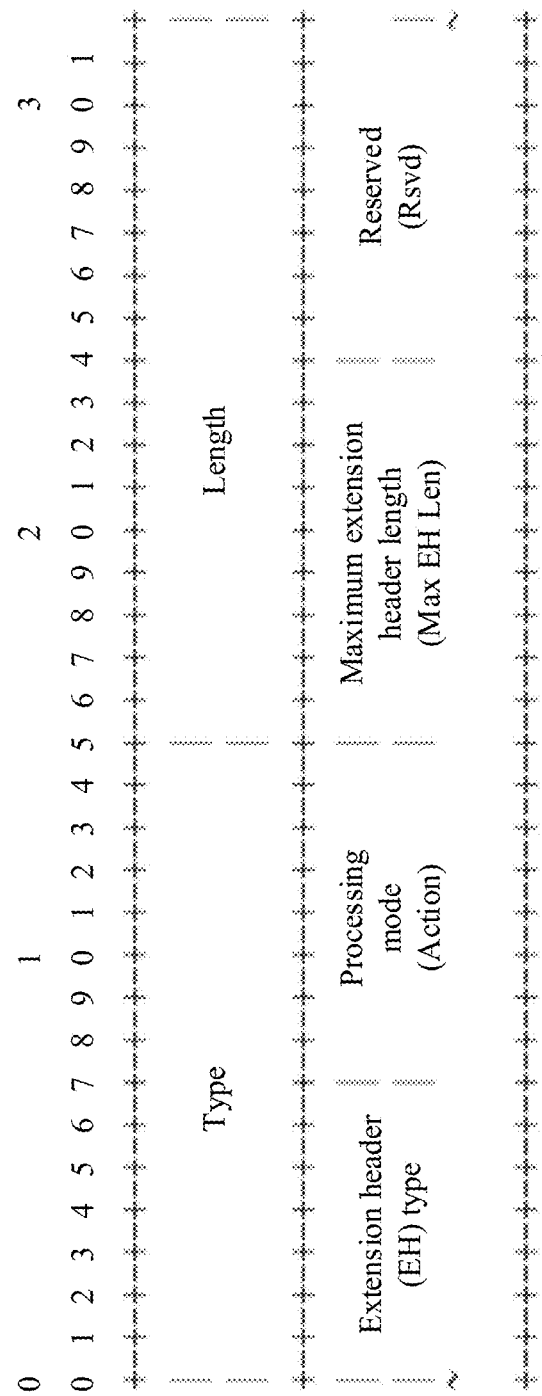
FIG. 3 is a schematic diagram of a structure of a packet encapsulation format according to an embodiment of this application.

When the extension header processing capability information includes the extension header type, the current processing mode, the configurable processing mode, and maximum extension header length information, a possible format of the extension header processing capability information is shown in FIG. 3. It may be understood that, in an actual application scenario, the extension header processing capability information may include one or more of the extension header type, the current processing mode, the configurable processing mode, and the maximum extension header length information, and a specific implementation format may alternatively be in another manner.

The following describes a type of the message sent by the first node to the second node in this embodiment.

The first node may send, to the second node in any proper manner, the message used to advertise the processing capability of the first node for the IPv6 extension header. Next, several message types and carrying manners that can be considered are described.

Type 1: BGP-LS message.

BGP-LS defines an opaque node attribute (ONA) TLV field, and the field can be used to carry an attribute of a node. In this embodiment of the present disclosure, a variable-length node attribute TLV is defined based on the ONA field, and is referred to as an extension header processing capability TLV. The TLV value field is used to carry extension header processing capability information that needs to be sent, for example, may include an extension header (EH) type identifier field, an extension header processing mode action field, and an EH length (Len) field. The action field may include a current processing mode and a configurable processing mode. The extension header length field may be a maximum extension header length supported for processing, or may be a specified length actually allowed for processing. A possible TLV format example is, for example:
  (a) EH type: It is an 8-bit integer, and used as a type identifier.
  (b) Action: (1) It includes a 3-bit integer, used to indicate a current processing mode. Further, 000: forward (forward), 001: dispatch to control plane, 010: discard, 011: ignore, 100: configurable, and 101 to 111: reserved. (2) It includes a 5-bit bitmap, used to indicate a configurable processing mode. Further, bit 0: forward, bit 1: dispatch to control plane, bit 2: discard, bit 3: ignore, and bit 4: reserved.
  (c) EH Len: It is an 8-bit integer.
  (d) Rsvd.: It is a reserved field, and may be set to 0 when the TLV is transmitted.

Type 2: PCEPLS report message.

An IETF individual draft (draft-dhodylee-pce-pcep-ls-15) on PCEP extension for implementing link state information and traffic engineering information distribution describes a mechanism of collecting link state information and traffic engineering information from a network by using the PCEP and sharing them with a path computation element (PCE). The draft defines a new PCEP message, which is referred to as an LS report message, that is, an LSRpt message. The PCEP LSRpt message is a PCEP message that is sent by a path computation client (PCC) to the PCE and that is used to report the link state and traffic engineering information. The PCC needs to report a change of the link state information to the PCE. That is, the PCC sends, to the PCE, an LSRpt message carrying the LS information. The LSRpt message may carry a plurality of LS objects. An LS Object includes a set of fields to describe a destination node or a link. Each node and link are uniquely identified by a PCEP LS identifier (LS-ID).

In this embodiment of this application, the extension header processing capability information is carried in PCEP-LS Attributes of an LS Object in an LSRpt message, and a variable-length sub-TLV is defined in a node attribute TLV, and is referred to as an extension header processing capability sub-TLV. The sub-TLV value field is used to carry extension header processing capability information that needs to be sent. In a specific example, for content and format styles of the extension header processing capability information in the sub-TLV, refer to related descriptions in the foregoing type 1.

Type 3: OSPF message.

According to A. Lindem, et al., "Extensions to OSPF for Advertising Optional Router Capabilities," *IETF RFC* 7770 (February 2016), OSPF can use an option field in an LSA packet to advertise an optional router capability. In this embodiment of the present disclosure, a variable-length node attribute TLV is defined, and is referred to as an extension header processing capability TLV. The extension header processing capability TLV is encoded in an OSPF RI opaque LSA, and used to carry extension header processing capability information of a router. The extension header processing capability TLV includes three fields: a 2-byte type field, a 2-byte length field, and one or more 4-byte value fields. The TLV value field is used to carry extension header processing capability information that needs to be advertised. In a specific example, for content and format styles of the extension header processing capability information in the TLV, refer to related descriptions in the foregoing Type 1.

Type 4: IS-IS router message.

According to L. Ginsberg, et al., "IS-IS Extensions for Advertising Router Information," *IETF RFC* 7981 (October 2016), an IS-IS router capability TLV allows a router to advertise a capability of the router in an IS-IS layer or an entire routing domain. The IS-IS router capability TLV may include a plurality of sub-TLVs. In this embodiment of the present disclosure, a variable-length sub-TLV is defined in the IS-IS router capability TLV, and is referred to as an extension header processing capability sub-TLV. Based on a format of the IS-IS router capability TLV, the extension header processing capability sub-TLV may include three fields: a 1-byte type field, a 1-byte length field, and one or more 4-byte values. The sub-TLV value field is used to carry extension header processing capability information that needs to be advertised. In a specific example, for content and format styles of the extension header processing capability information in the sub-TLV, refer to related descriptions in the foregoing type 1.

By using the messages of the foregoing types, the first node may advertise the extension header processing capability to the controller or another forward node in the domain. An actually selected message type may be determined with reference to a specific application scenario. For example, the processing capability may be advertised to the controller in the foregoing type 1 or type 2 message manner, or the processing capability may be advertised to another forward node in the domain in the foregoing type 3 or type 4 message manner. It may be understood that the foregoing types 1 to 4 are merely examples of optional message manners, and another message manner for advertising the processing capability and an advertisement object may be selected or defined as required. For example, a NETCONF protocol and a YANG model may be used for communication between the controller and the node, so as to advertise the extension header processing capability. Further, the extension header processing capability information may be described by using the YANG model, and sent to the controller by using the NETCONF protocol. In addition, in the foregoing embodiments, an object that receives the advertisement may be the controller, or may be another forward node within the control domain. The control domain may be, for example, an iFIT detection domain, an IGP domain, a BGP domain, an AS domain, or a same management domain across AS domains.

After the first node sends the message including the extension header processing capability information to the second node, as shown in FIG. 2, the method further includes the following steps.

S202. The second node receives the message sent by the first node, and the second node obtains, based on the extension header processing capability information included in the message, the processing capability of the first node for the IPv6 extension header.

The second node obtains, based on the specific content included in the extension header processing capability information, the processing capability of the first node for the IPv6 extension header. For example, the second node determines, based on the processing mode information included in the extension header processing capability information, the capability of the first node in the aspect of the processing mode for the IPv6 extension header. The processing mode may further include the current processing mode and/or the configurable processing mode. For a specific implementation form, refer to related descriptions in S201. For another example, the second node determines, based on the extension header processing length information included in the extension header processing capability information, the capability of the first node in the aspect of the processing length that can be supported or allowed for the IPv6 extension header. For another example, the second node determines, based on the extension header type identifier included in the extension header processing capability information, that the processing capability in the extension header processing capability information is directed to the extension header type having the extension header type identifier. The extension header processing capability information may include a plurality of different extension header type identifiers, which respectively correspond to processing capabilities of the first node for a plurality of different types of extension headers.

S203. The second node determines, based on the obtained processing capability of the first node for the IPv6 extension header, whether the first node is a node configured to forward or receive a packet. The packet includes the IPv6 extension header.

After obtaining the processing capability of the first node, the second node may determine, based on the processing capability of the first node and with reference to a specific application scenario and a control policy, whether the first node is required for an operation or management, for example, the first node is required as a node for forwarding or receiving a packet. In a possible case, the packet may belong to a traffic flow, and the traffic flow may be determined based on, for example, a service type, a time period, a source address, and a destination address. The second node determines, based on a control policy and the processing capability of the first node, whether the first node can be configured to forward or receive the traffic flow. One or more packets in the traffic flow include an IPv6 extension header.

The following describes, by using several specific application scenarios as examples, an operation performed after the second node obtains the processing capability of the first node.

Scenario 1: Determine a packet forwarding path:

The second node may obtain one or more IPv6 extension header processing capabilities that are respectively sent by one or more nodes including the first node, and compute and determine, based on the one or more processing capabilities, a forwarding path used to forward a packet. The packet may include an IPv6 extension header and belong to a traffic flow.

Figure 4:
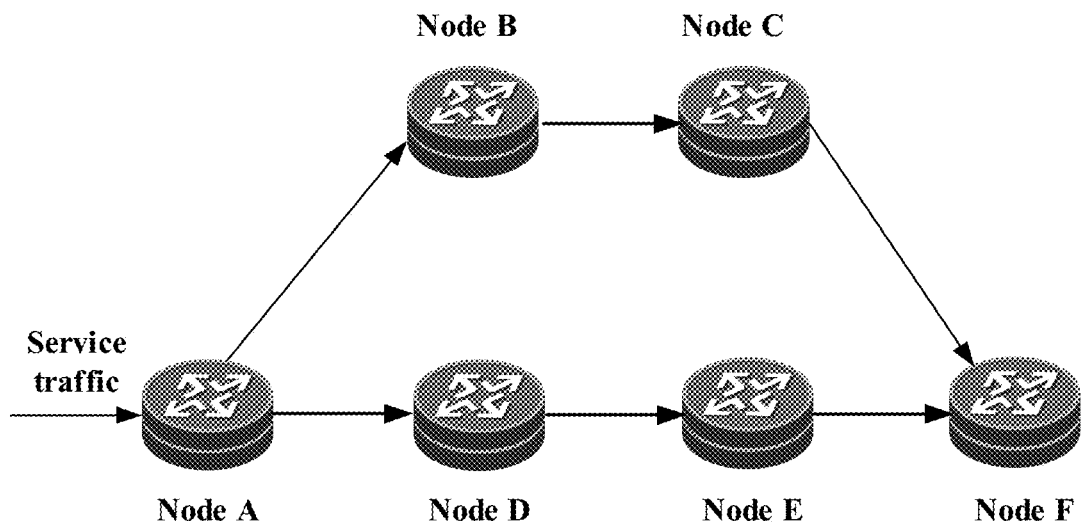
FIG. 4 is a schematic diagram of a structure of a network scenario according to an embodiment of this application.

For example, it is assumed that the first node is a node A, and the second node is a controller. The controller respectively obtains information that is sent by the node A, a node B, a node C, a node D, a node E, and a node F and that is used to indicate processing capabilities of corresponding nodes for the IPv6 extension header. A network structure including the nodes A to F is shown in FIG. 4. Table 1 shows an example of a processing capability of each node that is obtained by the controller based on information sent by each node.

TABLE 1

|  | Type identifier | Processing mode | Type identifier | Processing mode | Type identifier | Processing mode |
| --- | --- | --- | --- | --- | --- | --- |
| Node A | HBH | forward | DOH | ignore | SRH | forward |
| Node B | HBH | discard | DOH | discard | SRH | forward |
| Node C | HBH | forward | DOH | ignore | SRH | forward |
| Node D | HBH | forward | DOH | ignore | SRH | forward |
| Node E | HBH | forward | DOH | ignore | SRH | forward |
| Node F | HBH | forward | DOH | forward | SRH | forward |

The controller may perform path computation based on processing capabilities respectively supported by the nodes A to F for the HBH extension header, to determine a path used to transmit the packet of the traffic flow. In the example in Table 1, a processing capability may be determined based on a processing mode. The node B on a path A→ B→ C→ F does not support processing of the HBH, that is, when the packet of the traffic flow is sent to the node B, the node B discards the packet because the node B does not have a processing capability for the HBH. As a result, a packet loss occurs on the traffic flow. All nodes on a path A→ D→ E→ F support processing of the HBH, and can normally forward the packet after processing the HBH, to implement normal processing and forwarding of the traffic flow on the path. Therefore, the controller may select the path A→ D→ E→ F as the forwarding path of the packet of the traffic flow. In an iFIT end-to-end flow detection scenario, assuming that a head node in an iFIT detection domain is the node A and a tail node is the node F, the node A implements end-to-end iFIT detection of a traffic flow by encapsulating iFIT detection information into an IPv6 extension header HBH. In this case, if the node F is a destination node on an entire transmission path or a network node connected to a destination user host, it may be understood that the controller determines that the nodes A, D, and E are used as transmission nodes, or referred to as forward nodes, of the traffic flow, and the node F is used as a receive node of the traffic flow.

Similarly, the controller may also perform path computation based on processing capabilities respectively supported by the nodes A to F for the SRH extension header, to determine a packet forwarding path on which a segment routing (SR) list can be normally processed. The SR list is carried in the SRH. After computation, the controller determines that the SRH can be normally processed on both paths A→ B→ C→ F and A→ D→ E→ F. Therefore, the controller may determine that the two paths jointly serve as load sharing paths of the traffic flow, or may specify one of the paths with reference to information such as a resource occupation status as a path for forwarding the traffic flow.

Scenario 2: Determine a node that implements a specific function:

Assuming that the node F is a border node in the domain, the controller may determine, based on the DOH processing capability of the node F, that the node F is used as a tail node for transmitting the packet of the traffic flow in the domain. In this way, still using the iFIT scenario as an example, the controller may determine, based on that no node on the path A→ D→ E→ F discards the packet and the node F has the DOH processing capability, that the path A→ D→ E→ F is used as a transmission path to complete iFIT detection, and it is ensured that an iFIT detection header carried in the DOH of the traffic flow packet can be smoothly stripped at the tail node F of the iFIT detection domain, so that the traffic flow can be normally forwarded outside the detection domain.

It may be understood that, although an example in which the second node is a controller role is used in the foregoing scenario, the operation in the foregoing scenario such as path planning or determining a node having a specific processing capability (for example, extension header stripping) based on the processing capabilities of the network nodes for the IPv6 extension header may be performed by a node having another role type in the network, for example, any node having a forwarding capability in the network, such as a head node.

The processing modes, obtained by the second node, of the nodes A to F for various types of extension headers in Table 1 may be determined, for example, based on current processing modes in messages respectively sent by the nodes A to F, or may be determined based on configurable processing modes. For a specific process in which the second node determines, based on the received current processing modes and/or configurable processing modes, the processing modes supported by the nodes A-F, refer to related descriptions in S201. Details are not described herein again. It may be understood that, when the messages advertised by the nodes A to F include the configurable processing modes, based on this, the second node may determine that the node A, B, C, D, E, or F supports more than one processing mode. When the second node determines that a node supports more than one processing mode, it indicates that the node supports selective configuration of the processing modes supported by the node. Next, for example, the configurable processing modes of the nodes A to F that are obtained by the controller are shown in Table 2.

TABLE 2

|  | Type identifier | Processing mode | Type identifier | Processing mode | Type identifier | Processing mode |
|---|---|---|---|---|---|---|
| Node A | HBH | forward | DOH | ignore | SRH | forward |
| Node B | HBH | discard, dispatch to control plane, ignore | DOH | discard | SRH | discard, ignore |
| Node C | HBH | forward | DOH | ignore | SRH | forward |
| Node D | HBH | forward | DOH | ignore | SRH | forward |
| Node E | HBH | forward, dispatch to control plane | DOH | ignore | SRH | forward |
| Node F | HBH | forward, ignore | DOH | forward, ignore | SRH | forward |

For the foregoing scenario 1, during specific application to iFIT detection, the second node may still determine, based on that all the nodes on the path A→ D→ E→ F support the processing mode of forward for the HBH, that the path A → D→ E→ F is used for packet forwarding. However, before the computed path is published, messages need to be sent to automatically or manually configure processing modes of the node E and the node F for the HBH to forward. Before the node E and the node F are configured to forward, a configured processing mode of the node E and/or the node F may be any manner, or no processing mode is configured.

In some cases, for iFIT detection or other possible application scenarios, during path planning, the second node may alternatively allow some nodes on a path not to support forward. For example, all or some nodes on the path may support the processing mode of dispatch to control plane. In this case, in comparison with the manner of forward that can be completed on a forwarding plane, although packet processing efficiency is affected to some extent, end-to-end iFIT detection of the traffic flow can still be implemented. Therefore, the path may also be determined as an available forwarding path. For example, still based on Table 2, the second node may also determine the path A→ B→ C→ F as a traffic flow forwarding path, and send a message to configure a processing mode of the node B to dispatch to control plane. For another example, during path planning, the second node may alternatively allow a proportion of nodes on a path not to support forward or dispatch to control plane, but to support only the processing mode of ignore. For example, even if a proportion of nodes on an iFIT detection path do not support processing of an iFIT detection header encapsulated in an extension header, but can only ignore the iFIT detection header and perform forwarding processing, the second node may still determine, based on a specific path computation rule, the path including the node having the processing mode of ignore as a traffic flow transmission path. For example, when the node B is configured to the processing mode of ignore, the path A→ B→ C→ F is determined as a backup path or a load sharing path of the traffic flow, or even the path A→ B→ C→ F is determined as a primary path of the traffic flow with reference to network resource usage.

For the foregoing scenario 1, during specific application to an SR scenario, for example, each node along a path needs to be capable of processing an SR list encapsulated in an extension header, to implement forwarding along a specified path in the SR scenario, the second node needs to ensure that all nodes on the path support the manner of forward, or can support at least the manner of dispatch to control plane.

Therefore, the second node may select the path A→ D→ E→ F, and configure the nodes E and F to the manner of forward. Alternatively, the second node may consider to select the path A→ B→ C→ F. However, the node B can be configured to the manner of dispatch to control plane at most. Although the extension header may be processed, because the extension header needs to be sent to a control plane for processing, forwarding efficiency may be affected.

For the foregoing scenario 2, the second node may configure the node F to the manner of forward, and set the node F as the tail node of the iFIT detection domain, to ensure that the iFIT detection header in the packet is smoothly stripped at the tail node, and prevent the packet from being discarded outside the detection domain because the detection header cannot be identified.

The application of the processing mode in the processing capability of the first node is described above. In other cases, the processing capability advertised by the first node further includes the processing length. The second node may use the processing length in at least two optional manners.

First, the second node performs an operation based on the processing length. Assuming that the length value of the extension header supported for processing by the first node is a first value, when a length of an extension header that needs to be processed exceeds the first value, the second node may use a policy to control a length of an IPv6 extension header, or when the message carries the extension header type identifier, control a length of an IPv6 extension header of a specific type identified by the type identifier, so that the length of the IPv6 extension header in a packet sent to the first node does not exceed the first value, and the first node can perform normal processing on the extension header. In this case, the second node may further perform the operation based on the processing mode supported by the first node, for example, the current processing mode or the processing mode allowed to be configured. For example, when the processing mode is forward or dispatch to control plane, the second node performs the operation based on the processing length.

Second, the second node may not process or control an IPv6 extension header that exceeds the first value, but avoid selecting the first node when selecting a route or specifying a specific node.

It may be understood that, in the foregoing embodiment, although an example in which the extension header processing capability information includes information about the extension header type identifier, the processing mode, and the processing length is used, other content used to reflect the IPv6 extension header processing capability of the node may also be set with reference to an actual application scenario, and carried in the extension header processing capability information. In the foregoing embodiment, an example in which the processing mode includes forward, dispatch to control plane, ignore, or discard is used. However, on one hand, some descriptions about processing modes in which naming manners are different but actual processing modes are the same should also fall within the scope limited by the embodiments of this application. For example, dispatch to control plane is referred to as send to control plane or schedule (dispatch) to control plane, or as described in Section 4.8 of the standard RFC 8200, referred to as assign a packet including an HBH to a slow processing path for processing. For another example, an operation performed in the processing mode of discard is directly described as discarding a packet, rather than discarding the packet because the extension header cannot be identified. On the other hand, although operation details of a processing mode are different, for example, different in an aspect of specific included operation steps or in an aspect of a prerequisite that needs to be met to determine the processing mode, they should also fall within the scope limited by the embodiments of this application. For example, as described in Section 4 of the standard RFC 8200, after discarding a packet, the first node further needs to send an Internet Control Message Protocol (ICMP) parameter problem message to a source node that sends the packet. In addition, in an actual application scenario, in addition to the four processing modes of forward, dispatch to control plane, ignore, or discard, a processing mode of another type may be further set based on a specific requirement as content that needs to be advertised.

In some cases, in the foregoing method embodiment, the second node may further perform S204, and the first node may further perform S205.

S204. The second node sends a notification message to the first node. The notification message is used to indicate whether the first node is a node configured to forward or receive a packet.

In an example, in the foregoing scenario 1, that is, a scenario in which the second node determines a packet forwarding path based on a processing capability message sent by each node, the second node may send, based on a packet forwarding path obtained through computation, a corresponding notification message to a node on the forwarding path. If the forwarding path includes the first node, the first node can receive the notification message. The notification message may be used to notify the first node that the first node is selected as a node configured to forward or receive a packet. In some possible cases, the notification message may be further used to notify the first node to reserve a resource for forwarding a packet of a traffic flow, and/or used to forward a packet of a traffic flow of a specific type, and the like. This may be set based on a requirement.

S205. The first node forwards or receives the packet based on the notification message.

The first node determines, based on information carried in the notification message, whether a packet needs to be forwarded or received. The packet may belong to a traffic flow. In a possible manner, the notification message may not include information related to a reserved resource. Instead, the first node determines, based on a specific traffic flow that needs to be forwarded and local resource usage, a resource reservation policy, or the like, a corresponding resource required for forwarding the traffic flow.

According to the method for sending and processing a message that is provided in this embodiment of this application, the first node in the network can advertise the message of the processing capability of the first node for the IPv6 extension header to the second node, such as a controller node or another node in a same control domain, so that the second node performs processing based on a message sent by one or more nodes including the first node, to determine whether the one or more nodes can be configured to forward or receive a packet. This manner of planning a path or specifying a specific node based on an extension header processing capability of a node can better ensure normal packet forwarding, thereby improving a network management capability and quality of service.

Figure 5:
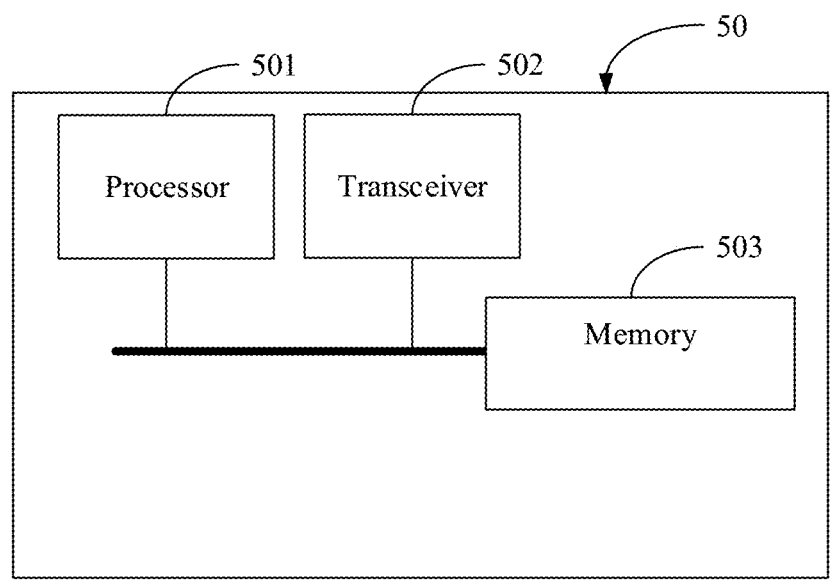
FIG. 5 is a schematic diagram of a structure of a network device according to an embodiment of this application.

An embodiment of this application further provides a network device 50 configured to perform the method for sending and processing a message that is provided in the foregoing method embodiment. The network device 50 may be a network device including the first node in the foregoing method embodiment, or may include a network device including the second node in the foregoing method embodiment. The first node or the second node may be the network device 50, or may be a function component or unit in the network device 50. Alternatively, the network device 50 may be a network device including the head node 102, the intermediate node 104, or the tail node 106 shown in FIG. 1, or may be the controller 108 shown in FIG. 1. As shown in FIG. 5, the network device 50 may include a processor 501 and a transceiver 502. In some cases, the network device 50 may further include a memory 503.

The following describes the components of the network device 50 with reference to FIG. 5.

The processor 501 is a control center of the network device 50. For example, the processor 501 may be a central processing unit (CPU), or an application-specific integrated circuit (ASIC), or may be configured as one or more integrated circuits implementing the embodiments of this application, for example, one or more microprocessors (DSP), or one or more field-programmable gate arrays (FPGA).

The transceiver 502 is configured to communicate with another device. The transceiver 502 may be a communications port or the like.

Program code, configuration files, or other content that can be used to implement the method in this application may be stored in an external network device or a cloud, or may be stored in the local memory 503 of the network device 50. The memory 503 may be a volatile memory, such as a random-access memory (RAM), or a nonvolatile memory, such as a read-only memory (ROM), a flash memory, a hard disk drive (HDD), or a solid-state drive (SSD), or a combination of the foregoing types of memories. The memory 503 is configured to store program code, configuration files, or other content that can implement the method in this application.

In a possible implementation, for example, when the network device 50 is the first node, the processor 501 may perform the following function by executing a program and/or a module stored at an external storage location or in the memory 503, and invoking data stored at an external storage location or in the memory 503: sending a message to a second node by using the transceiver 502, where the message includes first extension header processing capability information, and the first extension header processing capability information is used to indicate a processing capability of the first node for an IPv6 extension header.

In another possible implementation, for example, when the network device 50 is the second node, the processor 501 performs the following functions by executing a program and/or a module stored at an external storage location or in the memory 503, and invoking data stored at an external storage location or in the memory 503: sending, by using the transceiver 502, a message sent by a first node, where the message includes first extension header processing capability information, and obtaining, based on the first extension header processing capability information, a processing capability of the first node for an IPv6 extension header.

In some embodiments, the function that can be performed when the network device 50 includes the first node or the second node is merely an example. For another function that can be performed by the network device 50 as a corresponding role, refer to related descriptions in the foregoing method embodiment. Details are not described herein again.

In some embodiments, to implement the functions described in the foregoing method embodiment, the network device including the corresponding node may include a corresponding hardware structure and/or software module for executing each function. With reference to corresponding operations of each example described in the embodiments disclosed in this specification, this application may be implemented in a form of hardware or a combination of hardware and computer software. Whether a function is performed by hardware or hardware driven by computer software depends on particular applications and design constraints of the technical solutions.

In the embodiments of the present disclosure, function modules of the network device may be obtained according to the operations in the foregoing method embodiment. For example, the function modules may be obtained through division corresponding to functions, or two or more functions may be integrated into one processing module. The integrated module may be implemented in a form of hardware, or may be implemented in a form of a software function module. It should be noted that, in the embodiments of the present disclosure, module division is an example, and is merely a logical function division. During actual implementation, another division manner may be used.

Figure 6A:
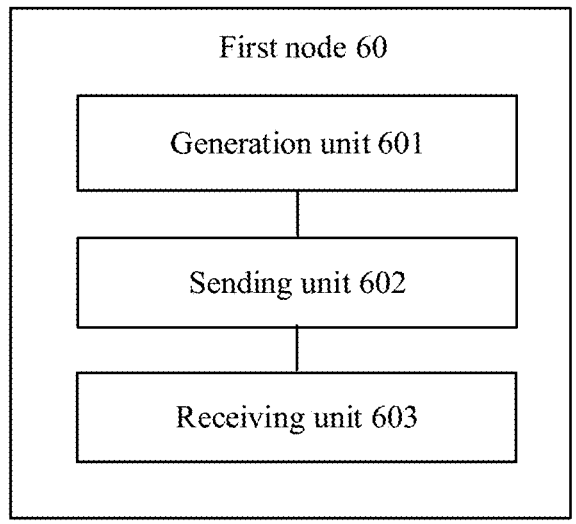
FIG. 6A is a schematic diagram of a structure of a first node according to an embodiment of this application.
Figure 6B:
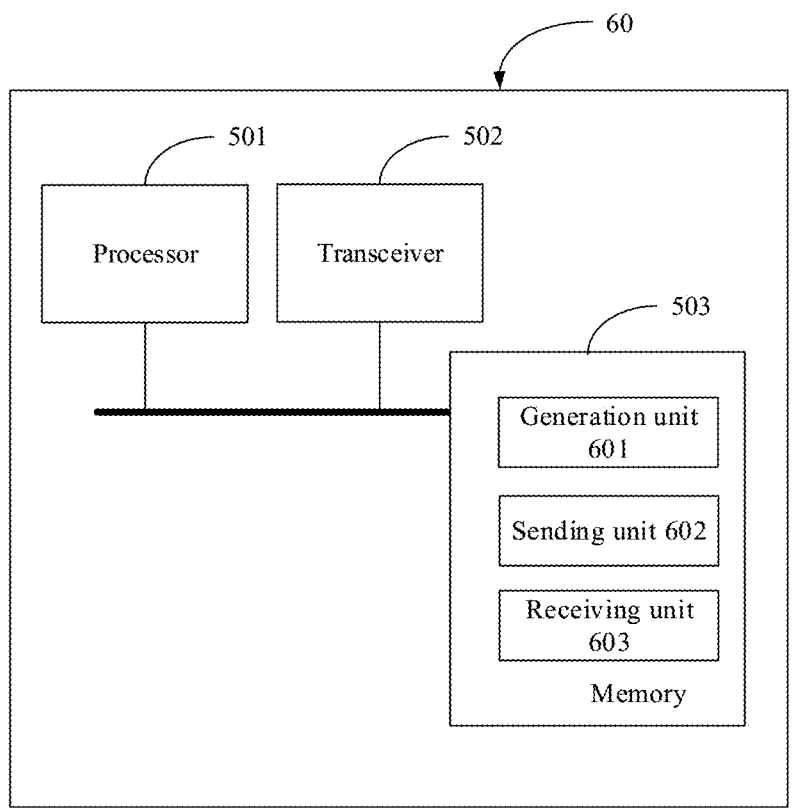
FIG. 6B is a schematic diagram of a structure of another first node according to an embodiment of this application.

FIG. 6A shows a first node 60 according to an embodiment of this application configured to implement functions performed by the first node in the foregoing embodiments. The first node 60 may be the network device 50, or may be an apparatus or a component deployed in the network device. As shown in FIG. 6A, the first node 60 may include a sending unit 602. The sending unit 602 may be configured to perform S201 in FIG. 2. In a possible manner, the first node 60 may further include a generation unit 601. The generation unit 601 is configured to generate a message that needs to be sent by the sending unit 602. The message is used to advertise a processing capability of the first node for an IPv6 extension header. In a possible manner, the first node 60 may further include a receiving unit 603. The receiving unit 603 may be configured to perform S205 in FIG. 2. In a possible specific implementation, the generation unit 601, the sending unit 602, and the receiving unit 603 included in the first node 60 may all be implemented in a form of a software module. A schematic diagram of a structure of the first node 60 in this case is shown in FIG. 6B. The processor 501 may invoke each function unit in the memory 503 to perform a corresponding function. For example, the processor 501 may invoke the generation unit 601 and the sending unit 602, to send the generated message to the transceiver 502, and the transceiver 502 sends the message to another network node. It may be understood that, all related content in the foregoing method embodiment may be referenced to function descriptions of corresponding function modules, and details are not described one by one herein.

The first node 60 may further include a storage unit configured to store program instructions and/or data. The storage unit may be coupled to another function unit. The coupling in the embodiments of this application is an indirect coupling or a communication connection between apparatuses, units, or modules, and may be in an electrical form, a mechanical form, or another form, and is used for information exchange between the apparatuses, the units, or the modules. For example, the generation unit 601 may cooperate with the storage unit. The generation unit 601 may execute the program instructions stored in the storage unit.

In a possible implementation form, a function of the sending unit 602 or the receiving unit 603 may be, for example, performed by a transceiver of the node. There may be one or more transceivers. When there is a plurality of transceivers, all the transceivers may be configured for receiving, or some of the transceivers may be configured for receiving and the others are configured for sending, or the like. A function of the generation unit 601 may be, for example, performed by a processor of the node. The storage unit may be included in the processor.

Figure 7A:
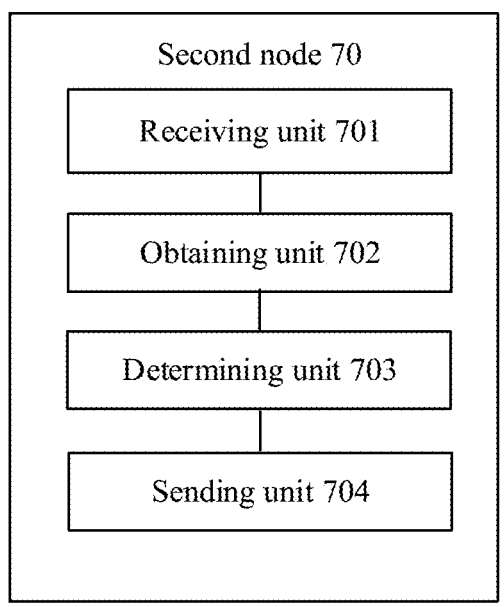
FIG. 7A is a schematic diagram of a structure of a second node according to an embodiment of this application.
Figure 7B:
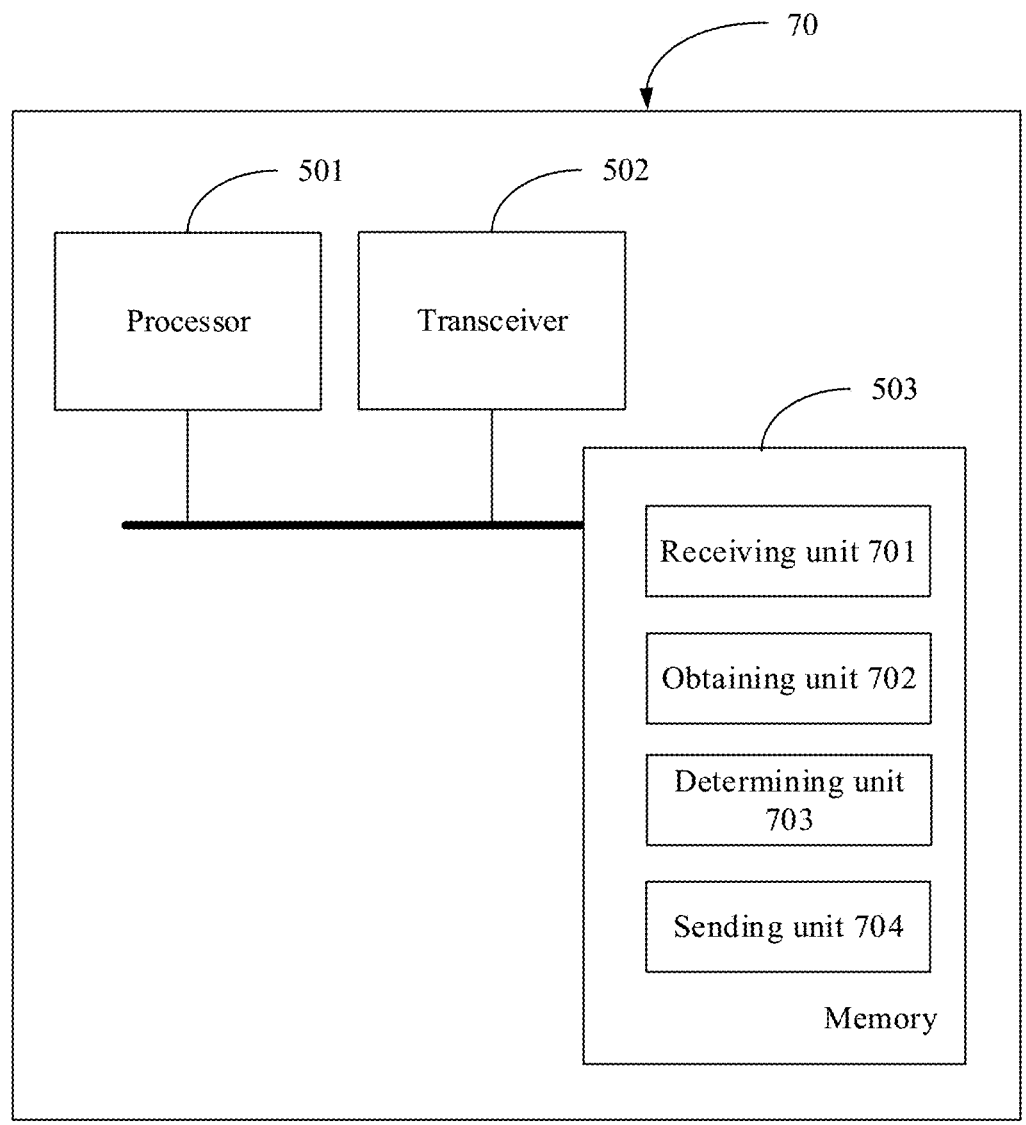
FIG. 7B is a schematic diagram of a structure of another second node according to an embodiment of this application.

FIG. 7A shows a second node 70 according to an embodiment of this application configured to implement functions performed by the second node in the foregoing embodiments. The second node 70 may be the network device 50, or may be an apparatus or a component deployed in the network device. As shown in FIG. 7A, the second node 70 may include a receiving unit 701 and an obtaining unit 702. The receiving unit 701 and the obtaining unit 702 may be configured to cooperate to perform S202 in FIG. 2. The second node may further include a determining unit 703. The determining unit 703 may be configured to perform S203 in FIG. 2. In a possible manner, the second node 70 may further include a sending unit 704. The sending unit 704 may be configured to perform S204 in FIG. 2. In a possible specific implementation, the receiving unit 701, the obtaining unit 702, the determining unit 703, and the sending unit 704 included in the second node 70 may all be implemented in a form of a software module. A schematic diagram of a structure of the second node 70 in this implementation is shown in FIG. 7B. It may be understood that, all related content in the foregoing method embodiment may be referenced to function descriptions of corresponding function modules, and details are not described one by one herein.

The second node 70 may further include a storage unit configured to store program instructions and/or data. The storage unit may be coupled to another function unit. The coupling in the embodiments of this application is an indirect coupling or a communication connection between apparatuses, units, or modules, and may be in an electrical form, a mechanical form, or another form, and is used for information exchange between the apparatuses, the units, or the modules. For example, the obtaining unit 702, the determining unit 703, and the like may cooperate with the storage unit to execute the program instructions stored in the storage unit.

In a possible implementation form, functions of the receiving unit 701 and the sending unit 704 may be performed by a transceiver of the node, and functions of the obtaining unit 702 and the determining unit 703 may be performed, for example, by a processor of the node. The storage unit may be included in the processor.

An embodiment of this application further provides a system. The system includes a second node and at least one first node. The at least one first node and the second node may be deployed in a same network device, or may be located in different network devices in a network. The at least one first node may be the first node in the foregoing method embodiment, or the first node 60 shown in FIG. 6A or FIG. 6B. When the at least one first node is a network device, the at least one first node may be the network device 50 shown in FIG. 5. The second node may be the second node in the foregoing method embodiment, or the second node 70 shown in FIG. 7A or FIG. 7B. When the second node is a network device, the second node may be the network device 50 shown in FIG. 5. The second node and the at least one first node may be configured to jointly complete the method in the foregoing method embodiment.

Another embodiment of this application provides a chip system. The chip system includes a processor, and may further include a memory configured to implement functions implemented by the first node or the network device including the first node in the foregoing embodiments. The chip system may include a chip, or may include a chip and another discrete device.

Another embodiment of this application provides a chip system. The chip system includes a processor, and may further include a memory configured to implement functions implemented by the second node or the network device including the second node in the foregoing embodiments. The chip system may include a chip, or may include a chip and another discrete device.

Some other embodiments of this application further provide a computer readable storage medium. The computer readable storage medium may include a computer program. When the computer program runs on a computer, the computer is enabled to perform content executed by the first node or the second node in the foregoing method embodiment.

The foregoing descriptions about implementations allow a person skilled in the art to clearly understand that, for the purpose of convenient and brief description, division into the foregoing function modules is taken as an example for illustration. In actual application, the foregoing functions can be allocated to different function modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes various mediums that can store program code, such as a Universal Serial Bus (USB) flash drive, a removable hard disk, a ROM, a RAM, a magnetic disk, and an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a first node, wherein the method comprises:
sending, to a second node, a message comprising first extension header processing capability information that indicates a first processing capability of the first node for an Internet Protocol (IP) version 6 (IPv6) extension header,
wherein the first processing capability includes a first processing mode that comprises a current processing mode or a configurable processing mode, wherein the configurable processing mode indicates that the first node supports configuration of a second processing mode for the IPv6 extension header,
wherein the current processing mode comprises any one of a processing mode of forward, a processing mode of dispatch to control plane, a processing mode of discard, or a processing mode of ignore,
wherein the configurable processing mode comprises at least one of the processing mode of forward, the processing mode of dispatch to control plane, the processing mode of discard, or the processing mode of ignore,
wherein the IPv6 extension header is carried in a packet, wherein the processing mode of forward comprises processing, by the first node, the IPv6 extension header on a forwarding plane and forwarding the packet,
wherein the processing mode of dispatch to control plane comprises sending, by the first node, the packet to a control plane to process the IPv6 extension header,
wherein the processing mode of discard comprises discarding the packet without identifying the IPv6 extension header, and
wherein the processing mode of ignore comprises forwarding the packet without processing the IPv6 extension header.

2. The method of claim 1, wherein the first processing capability comprises the first processing mode, and wherein the first processing mode indicates a second processing mode of the first node for the IPv6 extension header.

3. The method of claim 1, wherein the first extension header processing capability information comprises a first type identifier and indicates a second processing capability of the first node for the IPv6 extension header of a first type identified by the first type identifier.

4. The method of claim 1, wherein the current processing mode further comprises a processing mode of configurable, wherein the first processing mode comprises the current processing mode and the configurable processing mode, and wherein the first node supports processing of the IPv6 extension header in the configurable processing mode when the current processing mode is the processing mode of configurable.

5. The method of claim 1, wherein the first processing capability comprises a processing length, and wherein the processing length indicates a length of the IPv6 extension header that can support for processing by the first node.

6. The method of claim 1, wherein the message further comprises second extension header processing capability information, and wherein the second extension header processing capability information indicates a second processing capability of the first node for an IPv6 extension header of a second type.

7. The method of claim 1, wherein the message is a Border Gateway Protocol (BGP)-link state (LS) message, a Path Computation Element Protocol (PCEP) LS report message, an Open Shortest Path First (OSPF) message, or an Intermediate System-to-Intermediate System (IS-IS) router message.

8. The method of claim 7, wherein the first extension header processing capability information is carried in:
   an opaque node attribute (ONA) type-length-value (TLV) field in the BGP-LS message when the message is the BGP-LS message;
   a TLV field in the PCEP LS report message when the message is the PCEP LS report message;
   a capabilities TLV field in an OSPF router information (RI) opaque LS advertisement (LSA) message when the message is the OSPF RI opaque LSA message; and
   a capability TLV field in the IS-IS router message when the message is the IS-IS router message.

9. The method of claim 1, wherein the second node is a controller or belongs to a same control domain as the first node.

10. A method implemented by a second node, wherein the method comprises:
   receiving, from a first node, a message comprising first extension header processing capability information, wherein the message is a Border Gateway Protocol (BGP)-link state (LS) message, a Path Computation Element Protocol (PCEP) LS report message, an Open Shortest Path First (OSPF) message, or an Intermediate System-to-Intermediate System (IS-IS) router message, wherein the first extension header processing capability information is carried in:
      an opaque node attribute (ONA) type-length-value (TLV) field in the BGP-LS message when the message is the BGP-LS message;
      a TLV field in the PCEP LS report message when the message is the PCEP LS report message;
      a capabilities TLV field in an OSPF router information (RI) opaque LS advertisement (LSA) message when the message is the OSPF RI opaque LSA message; and
      a capability TLV field in the IS-IS router message when the message is the IS-IS router message; and
   obtaining, based on the first extension header processing capability information, a first processing capability of the first node for an Internet Protocol (IP) version 6 (IPv6) extension header.

11. The method of claim 10, further comprising determining, based on the first processing capability, whether the first node is configured to forward or receive a packet, wherein the packet comprises the IPv6 extension header.

12. The method of claim 10, wherein the first processing capability comprises a first processing mode, and wherein the first processing mode indicates a second processing mode of the first node for the IPv6 extension header.

13. The method of claim 12, further comprising determining, based on the first processing mode, that the first node is configured to forward or receive a packet.

14. The method of claim 13, wherein the first processing mode comprises a current processing mode or a configurable processing mode, and wherein the method further comprises:
   determining, based on the current processing mode comprising a processing mode of forward or a processing mode of dispatch to control plane, that the first node is configured to forward or receive the packet, wherein the processing mode of forward comprises processing, by the first node, the IPv6 extension header on a forwarding plane and forwarding the packet, and wherein the processing mode of dispatch to control plane comprises sending, by the first node, the packet to a control plane to process the IPv6 extension header; or
   determining, based on the configurable processing mode comprising the processing mode of forward or the processing mode of dispatch to control plane, that the first node is configured to forward or receive the packet.

15. The method of claim 14, wherein the first processing mode comprises the current processing mode and the configurable processing mode, and wherein the method further comprises:
   obtaining the configurable processing mode based on the current processing mode comprising a processing mode of configurable; and
   determining, based on the configurable processing mode comprising the processing mode of forward or the processing mode of dispatch to control plane, that the first node is configured to forward or receive the packet.

16. The method of claim 13, wherein after determining that the first node is configured to forward or receive the packet, the method comprises:
   publishing path information indicating that a path used to transmit the packet comprises the first node; or
   transmitting the packet to the first node.

17. A first node comprising:
   a memory configured to store instructions; and
   a processor coupled to the memory and configured to execute the instructions to cause the first node to:
      send, to a second node, a message comprising first extension header processing capability information that indicates a first processing capability of the first node for an Internet Protocol (IP) version 6 (IPv6) extension header,
      wherein the first processing capability includes a first processing mode that comprises a current processing mode or a configurable processing mode, wherein the configurable processing mode indicates that the first node supports configuration of a second processing mode for the IPv6 extension header,
      wherein the current processing mode comprises any one of a processing mode of forward, a processing mode of dispatch to control plane, a processing mode of discard, or a processing mode of ignore, wherein the configurable processing mode comprises at least one of the processing mode of forward, the processing mode of dispatch to control plane, the processing mode of discard, or the processing mode of ignore, wherein the IPv6 extension header is carried in a packet, wherein the processing mode of forward comprises processing, by the first node, the IPv6 extension header on a forwarding plane and forwarding the packet, wherein the processing mode of dispatch to control plane comprises sending, by the first node, the packet to a control plane to process the IPv6 extension header, wherein the processing mode of discard comprises discarding the packet without identifying the IPv6 extension header, and wherein the processing mode of ignore comprises forwarding the packet without processing the IPv6 extension header.

18. The first node of claim 17, wherein the first extension header processing capability information comprises a first type identifier and indicates a second processing capability of the first node for the IPv6 extension header of a first type identified by the first type identifier.

19. A second node comprising:
a memory configured to store instructions; and
a processor coupled to the memory and configured to execute the instructions to cause the second node to:
receive, from a first node, a message comprising first extension header processing capability information, wherein the message is a Border Gateway Protocol (BGP)-link state (LS) message, a Path Computation Element Protocol (PCEP) LS report message, an Open Shortest Path First (OSPF) message, or an Intermediate System-to-Intermediate System (IS-IS) router message, wherein the first extension header processing capability information is carried in:
an opaque node attribute (ONA) type-length-value (TLV) field in the BGP-LS message when the message is the BGP-LS message;
a TLV field in the PCEP LS report message when the message is the PCEP LS report message;
a capabilities TLV field in an OSPF router information (RI) opaque LS advertisement (LSA) message when the message is the OSPF RI opaque LSA message; and
a capability TLV field in the IS-IS router message when the message is the IS-IS router message; and
obtain, based on the first extension header processing capability information, a first processing capability of the first node for an Internet Protocol (IP) version 6 (IPv6) extension header.

20. The second node of claim 19, wherein the first processing capability comprises a first processing mode, and wherein the first processing mode indicates a second processing mode of the first node for the IPv6 extension header.

* * * * *